United States Patent
Wang et al.

(10) Patent No.: US 12,497,440 B2
(45) Date of Patent: *Dec. 16, 2025

(54) CS1 TARGETED CHIMERIC ANTIGEN RECEPTOR-MODIFIED T CELLS

(71) Applicant: City of Hope, Duarte, CA (US)

(72) Inventors: Xiuli Wang, Temple City, CA (US); Stephen J. Forman, Duarte, CA (US)

(73) Assignee: City of Hope, Duarte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,678

(22) Filed: Jul. 10, 2023

(65) Prior Publication Data

US 2024/0009288 A1   Jan. 11, 2024

Related U.S. Application Data

(63) Continuation of application No. 16/992,361, filed on Aug. 13, 2020, now Pat. No. 11,730,797, which is a continuation of application No. 15/533,153, filed as application No. PCT/US2015/064303 on Dec. 7, 2015, now Pat. No. 10,821,161.

(60) Provisional application No. 62/088,423, filed on Dec. 5, 2014.

(51) Int. Cl.

| | |
|---|---|
| *C07K 14/705* | (2006.01) |
| *A61K 40/11* | (2025.01) |
| *A61K 40/31* | (2025.01) |
| *A61K 40/42* | (2025.01) |
| *C07K 14/35* | (2006.01) |
| *C07K 14/71* | (2006.01) |
| *C07K 14/725* | (2006.01) |
| *C07K 16/28* | (2006.01) |
| *C12N 5/0783* | (2010.01) |

(52) U.S. Cl.
CPC ........ *C07K 14/70521* (2013.01); *A61K 40/11* (2025.01); *A61K 40/31* (2025.01); *A61K 40/42* (2025.01); *C07K 14/35* (2013.01); *C07K 14/705* (2013.01); *C07K 14/7051* (2013.01); *C07K 14/71* (2013.01); *C07K 16/2803* (2013.01); *C07K 16/2896* (2013.01); *C12N 5/0636* (2013.01); *C12N 5/0637* (2013.01); *C12N 5/0638* (2013.01); *C07K 2317/526* (2013.01); *C07K 2317/53* (2013.01); *C07K 2317/622* (2013.01); *C07K 2319/02* (2013.01); *C07K 2319/03* (2013.01); *C07K 2319/033* (2013.01); *C12N 2510/00* (2013.01)

(58) Field of Classification Search
None
See application file for complete search history.

(56) References Cited

U.S. PATENT DOCUMENTS

| | | | |
|---|---|---|---|
| 6,136,957 A | 10/2000 | Nicola et al. | |
| 8,084,026 B2 | 12/2011 | Glaser et al. | |
| 8,551,715 B2 | 10/2013 | Gurney et al. | |
| 10,358,494 B2 | 7/2019 | Yu et al. | |
| 10,821,161 B2 * | 11/2020 | Wang | A61K 40/42 |
| 11,730,797 B2 * | 8/2023 | Wang | C12N 5/0637 |
| | | | 435/328 |
| 2013/0287748 A1 | 10/2013 | June et al. | |
| 2016/0075784 A1 | 3/2016 | Yu et al. | |
| 2016/0333108 A1 | 11/2016 | Forman et al. | |
| 2017/0360910 A1 | 12/2017 | Wang et al. | |
| 2020/0188432 A1 | 6/2020 | Wang et al. | |
| 2021/0170001 A1 | 6/2021 | Wang et al. | |

FOREIGN PATENT DOCUMENTS

| | | |
|---|---|---|
| BR | 112016017806 | 10/2017 |
| CN | 101313069 | 11/2008 |
| RU | 2487888 | 7/2013 |
| RU | 2515108 | 5/2014 |
| WO | WO 2007/047829 | 4/2007 |
| WO | WO 2007/060406 | 5/2007 |
| WO | WO 2013/123061 | 8/2013 |
| WO | WO 2013/142034 | 9/2013 |
| WO | WO 2013/151762 | 10/2013 |
| WO | WO 2014/179759 | 11/2014 |
| WO | WO 2015/121454 | 8/2015 |
| WO | WO 2015/166056 | 11/2015 |

OTHER PUBLICATIONS

Berger et al., "Adoptive transfer of effector CD8+ T cells derived from central memory cells establishes persistent T cell memory in primates," J Clin Invest., 2008, 118(1):294-305.
Chien et al., "Significant structural and functional change of an antigen-binding site by a distant amino acid substitution: proposal of a structural mechanism," Proc Natl Acad Sci USA., Jul. 1989, 86(14):5532-5536.
Chu et al., "CS1-specific chimeric antigen receptor (CAR)-engineered natural killer cells enhance in vitro and in vivo antitumor activity against human multiple myeloma," Leukemia, Sep. 26, 2013, 28(4):917-927.
Chu et al., "Genetic modification of T cells redirected toward CS1 enhances eradication of myeloma cells," Clin Cancer Res., Aug. 1, 2014, 20(15):3989-4000.
Edelman et al., "The covalent structure of an entire γG immunoglobulin molecule." Proc Natl Acad Sci USA, May 1, 1969, 63(1):78-85.
European Office Action in EP Application No. 15819937.2 dated Sep. 20, 2018, 6 pages.
Galetto et al., "Abstract 2289: Allogenic TCRa/CS1 double knockout T-cells bearing an anti-CS1 chimeric antigen receptor: An improved immunotherapy approach for the treatment of multiple myeloma," AACR 107th Annual Meeting, Apr. 16-20, 2016, Cancer Res., 76(14):5 pages.

(Continued)

*Primary Examiner* — Phuong Huynh
(74) *Attorney, Agent, or Firm* — Fish & Richardson P.C.

(57) ABSTRACT

Chimeric antigen receptors for use in treating malignant melanoma and other cancers expressing CS1 are described.

14 Claims, 16 Drawing Sheets

Specification includes a Sequence Listing.

(56) References Cited

OTHER PUBLICATIONS

Galetto et al., "Bypassing the Constraint for Chimeric Antigen Receptor (CAR) Development in T-Cells Expressing the Targeted Antigen: Improvement of Anti-CS1 CAR Activity in Allogenic TCRa/CS1 Double Knockout T-Cells for the Treatment of Multiple Myeloma (MM)," Blood, 2015, 126(23):Abstract 116.
Hsi et al., "CS1, a potential new therapeutic antibody target for the treatment of multiple myeloma." Clin Cancer Res., May 1, 2008, 14(1):2775-84.
International Preliminary Report on Patentability in International Application No. PCT/US2015/064303, mailed on Jun. 15, 2017, dated Jun. 6, 2017, 2 pages.
International Search Report and Written Opinion in International Application No. PCT/US2015/064303, mailed on Apr. 25, 2016, 15 pages.
Jena et al., "Chimeric antigen receptor (CAR)-specific monoclonal antibody to detect CD19-specific T cells in clinical trials," PLoS One., 2013, 8(3):e57838.
Kalos et al., "Adoptive T cell transfer for cancer immunotherapy in the era of synthetic biology," Immunity, 2013, 39(1):49-60.
Lipowska-Bhalla et al., "Targeted Immunotherapy of cancer with CAR T cells: achievements and challenges," Cancer Immunol Immunother., Jul. 2012, 61(7):953-962.
Mathur et al., "Abstract 502: Universal SLAMF7-specific CAR T-cells as treatment for multiple myeloma," Blood, 2017, 130:15 pages.
Mathur et al., "Universal SLAMF7-Specific CAR T-Cells as Treatment for Multiple Myeloma," Blood, 2017, 130(Supplement 1):502.
Mchayleh et al., "Chimeric Antigen Receptor T-Cells: The Future is Now," J. Clin. Med., 2019, 8: 207-210.
Milone et al., "Chimeric Receptors Containing CD137 Signal Transduction Domains Mediate Enhanced Survival of T Cells and Increased Antileukemic Efficacy In Vivo," Mol Ther., Aug. 2009, 17(8):1453-1464.
Ohno et al., "Antigen-binding specificities of antibodies are primarily determined by seven residues of VH," Proc Natl Acad Sci USA., May 1985, 82(9):2945-2949.
Rudikoff et al., "Single amino acid substitution altering antigen-binding specificity," Proc Natl Acad Sci USA., Mar. 1982, 79(6):1979-1983.
Singer, "Geny and Genomy," Moscow, 1998, vol. 1, p. 63 Non-English Translation.
Tai et al., "Anti-CS1 humanized monoclonal antibody HuLuc63 inhibits myeloma cell adhesion and induces antibody-dependent cellular cytotoxicity in the bone marrow milieu," Blood, 2008, 112:1329-1337.
Till et al., "CD20-specific adoptive immunotherapy for lymphoma using a chimeric antigen receptor with both CD28 and 4-1BB domains: pilot clinical trial results," Blood, 2012, 119(17):3940-3950.
Vinay et al., "4-1BB Signaling Beyond T Cells," Cell Mol Immun., Jul. 2011, 8(4):281-284.
Wang et al., "Lenalidomide Enhances the Function of CS1 Chimeric Antigen Receptor-Redirected T Cells Against Multiple Myeloma," Clin. Cancer Res., Jan. 1, 2018, 24(1):106-119.

* cited by examiner

MLLLVTSLLLCELPHPAFLLIP EVQLVESGGGLVQPGGSLRLSCAASGFDFSRYWMSWVRQA

GMCSFRa signal peptide (22 aa)      CS1scFv ( aa)

PGKGLEWIGEINPDSSTINYAPSLKDKFIISRDNAKNSLYLQMNSLRAEDTAVYYCARPDGNY

WYFDVWGQGTLVTVSSGSTSGGGSGGGSGGGGSSDIQMTQSPSSLSASVGDRVTITCKAS

QDVGIAVAWYQQKPGKVPKLLIYWASTRHTGVPDRFSGSGSGTDFTLTISSLQPEDVATYYC

QQYSSYPYTFGQGTKVEIKES KYGPPCPPCP GGGSSGGGSGG QPREPQVYTLPPSQEEMTK

IgG4-Hinge (12 aa)   Linker (10 aa)   IgG4-CH3

NQVSLTCLVKGFYPSDIAVEWESNGQPENNYKTTPPVLDSDGSFFLYSRLTVDKSRWQEGN

VFSCSVMHEALHNHYTQKSLSLSLGK MFWVLVVVGGVLACYSLLVTVAFIIFWVR SKRSRGG

CD28 transmembrane (28 aa)      CD28 (41 aa)

HSDYMNMTPRRPGPTRKHYQPYAPPRDFAAYRS GGG RVKFSRSADAPAYQQGQNQLYNE

Gly3   CD3 Zeta ( 112 aa)

LNLGRREEYDVLDKRRGRDPEMGGKPRRKNPQEGLYNELQKDKMAEAYSEIGMKGERRRG

KGHDGLYQGLSTATKDTYDALHMQALPPR LEGGGEGRGSLLTCGDVEENPGPR MLLLVTSL

T2A (24 aa)                       EGFRt

LLCELPHPAFLLIPRKVCNGIGIGEFKDSLSINATNIKHFKNCTSISGDLHILPVAFRGDSFTHTP

PLDPQELDILKTVKEITGFLLIQAWPENRTDLHAFENLEIIRGRTKQHGQFSLAVVSLNITSLGL

RSLKEISDGDVIISGNKNLCYANTINWKKLFGTSGQKTKIISNRGENSCKATGQVCHALCSPEG

CWGPEPRDCVSCRNVSRGRECVDKCNLLEGEPREFVENSECIQCHPECLPQAMNITCTGRG

PDNCIQCAHYIDGPHCVKTCPAGVMGENNTLVWKYADAGHVCHLCHPNCTYGCTGPGLE

GCPTNGPKIPSIATGMVGALLLLLVVALGIGLFM

FIG. 2

MLLLVTSLLLCELPHPAFLLIPEVQLVESGGGLVQPGGSLRLSCAASGFDFSRYWMSWVRQA

GMCSFRa signal            CS1scFv

PGKGLEWIGEINPDSSTINYAPSLKDKFIISRDNAKNSLYLQMNSLRAEDTAVYYCARPDGNY
WYFDVWGQGTLVTVSSGSTSGGGSGGGSGGGGSSDIQMTQSPSSLSASVGDRVTITCKAS
QDVGIAVAWYQQKPGKVPKLLIYWASTRHTGVPDRFSGSGSGTDFTLTISSLQPEDVATYYC
QQYSSYPYTFGQGTKVEIKESKYGPPCPPCPGGGSSGGGSGGQPREPQVYTLPPSQEEMTK

IgG4 hinge         linker         IgG4

NQVSLTCLVKGFYPSDIAVEWESNGQPENNYKTTPPVLDSDGSFFLYSRLTVDKSRWQEGN
VFSCSVMHEALHNHYTQKSLSLSLGKMALIVLGGVAGLLLFIGLGIFFKRGRKKLLYIFKQPFM

CD4tm                        4-1BB

RPVQTTQEEDGCSCRFPEEEEGGCELGGGRVKFSRSADAPAYQQGQNQLYNELNLGRREEY

Gly3    Zeta

DVLDKRRGRDPEMGGKPRRKNPQEGLYNELQKDKMAEAYSEIGMKGERRRGKGHDGLYQ
GLSTATKDTYDALHMQALPPRLEGGGEGRGSLLTCGDVEENPGPRMLLLVTSLLLCELPHPA

T2A                        EGFRt

FLLIPRKVCNGIGIGEFKDSLSINATNIKHFKNCTSISGDLHILPVAFRGDSFTHTPPLDPQELDIL
KTVKEITGFLLIQAWPENRTDLHAFENLEIIRGRTKQHGQFSLAVVSLNITSLGLRSLKEISDGD
VIISGNKNLCYANTINWKKLFGTSGQKTKIISNRGENSCKATGQVCHALCSPEGCWGPEPRD
CVSCRNVSRGRECVDKCNLLEGEPREFVENSECIQCHPECLPQAMNITCTGRGPDNCIQCAH
YIDGPHCVKTCPAGVMGENNTLVWKYADAGHVCHLCHPNCTYGCTGPGLEGCPTNGPKIP
SIATGMVGALLLLLVVALGIGLFM

FIG. 6

MLLLVTSLLLCELPHPAFLLIPEVQLVESGGGLVQPGGSLRLSCAASGFDFSRYWMSWVRQA

GMSCFRa　　　　　　　CS1scFV

PGKGLEWIGEINPDSSTINYAPSLKDKFIISRDNAKNSLYLQMNSLRAEDTAVYYCARPDGNY
WYFDVWGQGTLVTVSSGSTSGGGSGGGSGGGGSSDIQMTQSPSSLSASVGDRVTITCKAS
QDVGIAVAWYQQKPGKVPKLLIYWASTRHTGVPDRFSGSGSGTDFTLTISSLQPEDVATYYC
QQYSSYPYTFGQGTKVEIKESKYGPPCPPCPAPEFEGGPSVFLFPPKPKDTLMISRTPEVTCVV

IgG4

VDVSQEDPEVQFNWYVDGVEVHNAKTKPREEQFQSTYRVVSVLTVLHQDWLNGKEYKCK
VSNKGLPSSIEKTISKAKGQPREPQVYTLPPSQEEMTKNQVSLTCLVKGFYPSDIAVEWESNG
QPENNYKTTPPVLDSDGSFFLYSRLTVDKSRWQEGNVFSCSVMHEALHNHYTQKSLSLSLGK

MALIVLGGVAGLLLFIGLGIFFKRGRKKLLYIFKQPFMRPVQTTQEEDGCSCRFPEEEEGGCEL

CD4tm　　　　　　　4-1BB

GGGRVKFSRSADAPAYQQGQNQLYNELNLGRREEYDVLDKRRGRDPEMGGKPRRKNPQE

Gly3　Zeta

GLYNELQKDKMAEAYSEIGMKGERRRGKGHDGLYQGLSTATKDTYDALHMQALPPRLEGG

T2A

GEGRGSLLTCGDVEENPGPRMLLLVTSLLLCELPHPAFLLIPRKVCNGIGIGEFKDSLSINATNI

EGFt

KHFKNCTSISGDLHILPVAFRGDSFTHTPPLDPQELDILKTVKEITGFLLIQAWPENRTDLHAFE
NLEIIRGRTKQHGQFSLAVVSLNITSLGLRSLKEISDGDVIISGNKNLCYANTINWKKLFGTSGQ
KTKIISNRGENSCKATGQVCHALCSPEGCWGPEPRDCVSCRNVSRGRECVDKCNLLEGEPRE
FVENSECIQCHPECLPQAMNITCTGRGPDNCIQCAHYIDGPHCVKTCPAGVMGENNTLVW
KYADAGHVCHLCHPNCTYGCTGPGLEGCPTNGPKIPSIATGMVGALLLLLVVALGIGLFM

FIG. 7

MLLLVTSLLLCELPHPAFLLIPEVQLVESGGGLVQPGGSLRLSCAASGFDFSRYWMSWVRQA

GMCSFRa            CS1scFv

PGKGLEWIGEINPDSSTINYAPSLKDKFIISRDNAKNSLYLQMNSLRAEDTAVYYCARPDGNY
WYFDVWGQGTLVTVSSGSTSGGGSGGGSGGGGSSDIQMTQSPSSLSASVGDRVTITCKAS
QDVGIAVAWYQQKPGKVPKLLIYWASTRHTGVPDRFSGSGSGTDFTLTISSLQPEDVATYYC
QQYSSYPYTFGQGTKVEIKESKYGPPCPPCPAPEFEGGPSVFLFPPKPKDTLMISRTPEVTCVV

IgG4

VDVSQEDPEVQFNWYVDGVEVHNAKTKPREEQFQSTYRVVSVLTVLHQDWLNGKEYKCK
VSNKGLPSSIEKTISKAKGQPREPQVYTLPPSQEEMTKNQVSLTCLVKGFYPSDIAVEWESNG
QPENNYKTTPPVLDSDGSFFLYSRLTVDKSRWQEGNVFSCSVMHEALHNHYTQKSLSLSLGK
MFWVLVVVGGVLACYSLLVTVAFIIFWVRSKRSRGGHSDYMNMTPRRPGPTRKHYQPYAP

CD28tm             CD28cyto

PRDFAAYRSGGGRVKFSRSADAPAYQQGQNQLYNELNLGRREEYDVLDKRRGRDPEMGG

Gly3  Zeta

KPRRKNPQEGLYNELQKDKMAEAYSEIGMKGERRRGKGHDGLYQGLSTATKDTYDALHM
QALPPRLEGGGEGRGSLLTCGDVEENPGPRMLLLVTSLLLCELPHPAFLLIPRKVCNGIGIGEF

T2A                EGFRt

KDSLSINATNIKHFKNCTSISGDLHILPVAFRGDSFTHTPPLDPQELDILKTVKEITGFLLIQAWP
ENRTDLHAFENLEIIRGRTKQHGQFSLAVVSLNITSLGLRSLKEISDGDVIISGNKNLCYANTIN
WKKLFGTSGQKTKIISNRGENSCKATGQVCHALCSPEGCWGPEPRDCVSCRNVSRGRECVD
KCNLLEGEPREFVENSECIQCHPECLPQAMNITCTGRGPDNCIQCAHYIDGPHCVKTCPAGV
MGENNTLVWKYADAGHVCHLCHPNCTYGCTGPGLEGCPTNGPKIPSIATGMVGALLLLLV
VALGIGLFM

FIG. 8

MLLLVTSLLLCELPHPAFLLIPEVQLVESGGGLVQPGGSLRLSCAASGFDFSRYWMSWVRQA

GMCSFa                    CS1scFv

PGKGLEWIGEINPDSSTINYAPSLKDKFIISRDNAKNSLYLQMNSLRAEDTAVYYCARPDGNY
WYFDVWGQGTLVTVSSGSTSGGGSGGGSGGGGSSDIQMTQSPSSLSASVGDRVTITCKAS
QDVGIAVAWYQQKPGKVPKLLIYWASTRHTGVPDRFSGSGSGTDFTLTISSLQPEDVATYYC
QQYSSYPYTFGQGTKVEIKGGGSSGGGSGMALIVLGGVAGLLLFIGLGIFFKRGRKKLLYIFKQ linker          CD4tm                    4-1BB

PFMRPVQTTQEEDGCSCRFPEEEEGGCELGGGRVKFSRSADAPAYQQGQNQLYNELNLGR

Gly3  Zeta

REEYDVLDKRRGRDPEMGGKPRRKNPQEGLYNELQKDKMAEAYSEIGMKGERRRGKGHD
GLYQGLSTATKDTYDALHMQALPPRLEGGGEGRGSLLTCGDVEENPGPRMLLLVTSLLLCEL

T2A                    EGFRt

PHPAFLLIPRKVCNGIGIGEFKDSLSINATNIKHFKNCTSISGDLHILPVAFRGDSFTHTPPLDPQ
ELDILKTVKEITGFLLIQAWPENRTDLHAFENLEIIRGRTKQHGQFSLAVVSLNITSLGLRSLKEI
SDGDVIISGNKNLCYANTINWKKLFGTSGQKTKIISNRGENSCKATGQVCHALCSPEGCWGP
EPRDCVSCRNVSRGRECVDKCNLLEGEPREFVENSECIQCHPECLPQAMNITCTGRGPDNCI
QCAHYIDGPHCVKTCPAGVMGENNTLVWKYADAGHVCHLCHPNCTYGCTGPGLEGCPTN
GPKIPSIATGMVGALLLLLVVALGIGLFM

FIG. 9

MLLLVTSLLLCELPHPAFLLIPEVQLVESGGGLVQPGGSLRLSCAASGFDFSRYWMSWVRQA

GMCSFRa            CS1scFv

PGKGLEWIGEINPDSSTINYAPSLKDKFIISRDNAKNSLYLQMNSLRAEDTAVYYCARPDGNY
WYFDVWGQGTLVTVSSGSTSGGGSGGGSGGGGSSDIQMTQSPSSLSASVGDRVTITCKAS
QDVGIAVAWYQQKPGKVPKLLIYWASTRHTGVPDRFSGSGSGTDFTLTISSLQPEDVATYYC
QQYSSYPYTFGQGTKVEIKGGGSSGGGSGMFWVLVVVGGVLACYSLLVTVAFIIFWVRSKRS

Linker         CD28tm                    CD28cyto

RGGHSDYMNMTPRRPGPTRKHYQPYAPPRDFAAYRSGGGRVKFSRSADAPAYQQGQNQ

Gly3  Zeta

LYNELNLGRREEYDVLDKRRGRDPEMGGKPRRKNPQEGLYNELQKDKMAEAYSEIGMKGE
RRRGKGHDGLYQGLSTATKDTYDALHMQALPPRLEGGGEGRGSLLTCGDVEENPGPRMLL

T2A              EGFRt
LVTSLLLCELPHPAFLLIPRKVCNGIGIGEFKDSLSINATNIKHFKNCTSISGDLHILPVAFRGDSF
THTPPLDPQELDILKTVKEITGFLLIQAWPENRTDLHAFENLEIIRGRTKQHGQFSLAVVSLNIT
SLGLRSLKEISDGDVIISGNKNLCYANTINWKKLFGTSGQKTKIISNRGENSCKATGQVCHALC
SPEGCWGPEPRDCVSCRNVSRGRECVDKCNLLEGEPREFVENSECIQCHPECLPQAMNITC
TGRGPDNCIQCAHYIDGPHCVKTCPAGVMGENNTLVWKYADAGHVCHLCHPNCTYGCTG
PGLEGCPTNGPKIPSIATGMVGALLLLLVVALGIGLFM

FIG. 10

```
   1 GTAGACCAG ATCTGAGCCT GGGAGCTCTC TGGCTAACTA GGGAACCCAC TGCTTAAGCC
     CAATCTGGTC TAGACTCGGA CCCTCGAGAG ACCGATTGAT CCCTTGGGTG ACGAATTCGG
  61 TCAATAAAGC TTGCCTTGAG TGCTTCAAGT AGTGTGTGCC CGTCTGTTGT GTGACTCTGG
     AGTTATTTCG AACGGAACTC ACGAAGTTCA TCACACACGG GCAGACAACA CACTGAGACC
 121 TAACTAGAGA TCCCTCAGAC CCTTTTAGTC AGTGTGGAAA ATCTCTAGCA GTGGCGCCCG
     ATTGATCTCT AGGGAGTCTG GGAAAATCAG TCACACCTTT TAGAGATCGT CACCGCGGGC
 181 AACAGGGACT TGAAAGCGAA AGGGAAACCA GAGGAGCTCT CTCGACGCAG GACTCGGCTT
     TTGTCCCTGA ACTTTCGCTT TCCCTTTGGT CTCCTCGAGA GAGCTGCGTC CTGAGCCGAA
 241 GCTGAAGCGC GCACGGCAAG AGGCGAGGGG CGGCGACTGG TGAGTACGCC AAAAATTTTG
     CGACTTCGCG CGTGCCGTTC TCCGCTCCCC GCCGCTGACC ACTCATGCGG TTTTTAAAAC
 301 ACTAGCGGAG GCTAGAAGGA GAGAGATGGG TGCGAGAGCG TCAGTATTAA GCGGGGGAGA
     TGATCGCCTC CGATCTTCCT CTCTCTACCC ACGCTCTCGC AGTCATAATT CGCCCCCTCT
 361 ATTAGATCGA TGGGAAAAAA TTCGGTTAAG GCCAGGGGGA AGAAAAAAT ATAAATTAAA
     TAATCTAGCT ACCCTTTTTT AAGCCAATTC CGGTCCCCCT TCTTTTTTA TATTTAATTT
 421 ACATATAGTA TGGGCAAGCA GGGAGCTAGA ACGATTCGCA GTTAATCCTG GCCTGTTAGA
     TGTATATCAT ACCCGTTCGT CCCTCGATCT TGCTAAGCGT CAATTAGGAC CGGACAATCT
 481 AACATCAGAA GGCTGTAGAC AAATACTGGG ACAGCTACAA CCATCCCTTC AGACAGGATC
     TTGTAGTCTT CCGACATCTG TTTATGACCC TGTCGATGTT GGTAGGGAAG TCTGTCCTAG
 541 AGAAGAGCTT AGATCATTAT ATAATACAGT TATTGTGTGC ATCAAAGGAT
     TCTTCTTGAA TCTAGTAATA TATTATGTCA ATAACACACG TAGTTCCTA
 601 AGAGATAAAA GACACCAAGG AAGCTTTAGA CAAGATAGAG GAAGAGCAAA ACAAAAGTAA
     TCTCTATTTT CTGTGGTTCC TTCGAAATCT GTTCTATCTC CTTCTCGTTT TGTTTTCATT
 661 GAAAAAAGCA CAGCAAGCAG CAGCTGACAC AGGACACAGC AATCAGGTCA GCCAAAATTA
     CTTTTTTCGT GTCGTTCGTC GTCGACTGTG TCCTGTGTCG TTAGTCCAGT CGGTTTTAAT
 721 CCCTATAGTG CAGAACATCC AGGGGCAAAT GGTACATCAG GCCATATCAC CTAGAACTTT
     GGGATATCAC GTCTTGTAGG TCCCCGTTTA CCATGTAGTC CGGTATAGTG GATCTTGAAA
 781 AAATGCATGG GTAAAAGTAG TAGAAGAGAA GGCTTTCAGC CCAGAAGTGA TACCCATGTT
     TTTACGTACC CATTTTCATC ATCTTCTCTT CCGAAAGTCG GGTCTTCACT ATGGGTACAA
 841 TTCAGCATTA TCAGAAGGAG CCACCCCACA AGATTTAAAC ACCATGCTAA ACACAGTGGG
     AAGTCGTAAT AGTCTTCCTC GGTGGGGTGT TCTAAATTTG TGGTACGATT TGTGTCACCC
 901 GGGACATCAA GCAGCCATGC AAATGTTAAA AGAGACCATC AATGAGGAAG CTGCAGGCAA
     CCCTGTAGTT CGTCGGTACG TTTACAATTT TCTCTGGTAG TTACTCCTTC GACGTCCGTT
 961 AGAGAAGAGT GGTGCAGAGA GAAAAAAGAG CAGTGGGAAT AGGAGCTTTG TTCCTTGGGT
     TCTCTTCTCA CCACGTCTCT CTTTTTTCTC GTCACCCTTA TCCTCGAAAC AAGGAACCCA
1021 TCTTGGGAGC AGCAGGAAGC ACTATGGGCG CAGCGTCAAT GACGCTGACG GTACAGGCCA
     AGAACCCTCG TCGTCCTTCG TGATACCCGC GTCGCAGTTA CTGCGACTGC CATGTCCGGT
1081 GACAATTGT GTCTGGTATA GTGCAGCAGC AGAACAATTT GCTGAGGGCT ATTGAGGCGC
     CTGTTAATAA CAGACCATAT CACGTCGTCG TCTTGTTAAA CGACTCCCGA TAACTCCGCG
1141 AACAGCATCT GTTGCAACTC ACAGTCTGGG GCATCAAGCA GCTCCAGGCA AGAATCCTGG
     TTGTCGTAGA CAACGTTGAG TGTCAGACCC CGTAGTTCGT CGAGGTCCGT TCTTAGGACC
1201 CTGTGGAAAG ATACCTAAAG GATCAACAGC TCCTGGGGAT TTGGGGTTGC TCTGGAAAAC
     GACACCTTTC TATGGATTTC CTAGTTGTCG AGGACCCCTA AACCCCAACG AGACCTTTTG
1261 TCATTTGCAC CACTGCTGTG CCTTGGATCT ACAAATGGCA GTATTCATCC ACAATTTTAA
     AGTAAACGTG GTGACGACAC GGAACCTAGA TGTTTACCGT CATAAGTAGG TGTTAAAATT
1321 AAGAAAAGGC GGGGATTGGGG GGTACAGTGC AGGGGAAAGA ATAGTAGACA TAATAGCAAC
     TTCTTTTCCC CCCTAACCCC CCATGTCACG TCCCCCTTTCT TATCATCTGT ATTATCGTTG
1381 AGACATACAA ACTAAAGAAT TACAAAAACA AATTACAAAA ATTCAAAATT TCGGGTTTA
     TCTGTATGTT TGATTTCTTA ATGTTTTTGT TTAATGTTTT TAAGTTTTAA AGCCCAAAT
1441 TTACAGGGAC AGCAGAGATC CAGTTTGGGG ATCAATTGCA TGAAGAATCT GCTTAGGGTT
     AATGTCCCTG TCGTCTCTAG GTCAAACCCC TAGTTAACGT ACTTCTTAGA CGAATCCCAA
1501 AGGCGTTTTG CGCTGCTTCG CGAGGATCTG CGATCGCTCC GGTGCCCGTC AGTGGGCAGA
     TCCGCAAAAC GCGACGAAGC GCTCCTAGAC GCTAGCGAGG CCACGGGCAG TCACCCGTCT
1561 GCGCACATCG CCCACAGTCC CCGAGAAGTT GGGGGGAGGG GTCGGCAATT GAACCGGTGC
     CGCGTGTAGC GGGTGTCAGG GGCTCTTCAA CCCCCCTCCC CAGCCGTTAA CTTGGCCACG
1621 CTAGAGAAGG TGGCGCGGGG TAAACTGAGA AAGTGATGTC GTGTACTGGC TCCGCCTTTT
     GATCTCTTCC ACCGCGCCCC ATTTGACCCT TTCACTACAG CACATGACCG AGGCCGAAAA
1681 TCCCGAGGGT GGGGGAGAAC CGTATATAAG TGCAGTAGTC GCCGTGAACG TTCTTTTTCG
     AGGGCTCCCA CCCCCTCTTG GCATATATTC ACGTCATCAG CGGCACTTGC AAGAAAAAGC
1741 CAACGGGTTT GCCGCCAGAA CACAGCTGAA GCTTCGAGGG GCTCGCATCT CTCCTTCACG
     GTTGCCCAAA CGGCGGTCTT GTGTCGACTT CGAAGCTCCC CGAGCGTAGA GAGGAAGTGC
1801 CGCCCGCCGC CCTACCTGAG GCCGCCATCC ACGCCGGTTG AGTCGCGTTC TGCCGCCTCC
     GCGGGCGGCG GGATGGACTC CGGCGGTAGG TGCGGCCAAC TCAGCGCAAG ACGGCGGAGG
1861 CGCCCTGTGGT GCCTCCTGAA CTGCGTCCGC CGTCTAGGTA AGTTTAAAGC TCAGGTCGAG
     GCGGACACCA CGGAGGACTT GACGCAGGCG GCAGATCCAT TCAAATTTGC AGTCCAGCTC
1921 ACCGGGCCTT TGTCCGGCGC TCCCTTGGAG CCTACCTAGA CTCAGCCGGC TCTCCACGCT
     TGGCCCGGAA ACAGGCCGCG AGGGAACCTC GGATGGATCT GAGTCGGCCG AGAGGTGCGA
```

FIG. 11A

```
1981 TTGCCTGACC CTGCTTGCTC AACTCTACGT CTTTGTTTCG TTTTCTGTTC TGCGCCGTTA
     AACGGACTGG GACGAACGAG TTGAGATGCA GAAACAAAGC AAAAGACAAG ACGCGGCAAT
2041 CAGATCCAAG CTGTGACCGG CGCCTACGGC TAGCGCCGCC ACCATGCTGC TGCTCGTGAC
     GTCTAGGTTC GACACTGGCC GCGGATGCCG ATCGCGGCGG TGGTACGACG ACGAGCACTG
2101 ATCTCTGCTG CTGTGCGAGC TGCCCCACCC CGCCTTTCTG CTGATTCCTG AGGTGCAGCT
     TAGAGACGAC GACACGCTCG ACGGGGTGGG GCGGAAAGAC GACTAAGGAC TCCACGTCGA
2161 GGTGGAAAGC GGCGGAGGAC TGGTGCAGCC TGGCGGATCT CTGAGACTGA GCTGTGCCGC
     CCACCTTTCG CCGCCTCCTG ACCACGTCGG ACCGCCTAGA GACTCTGACT CGACACGGCG
2221 CAGCGGCTTC GACTTCAGCC GGTACTGGAT GAGCTGGGTG CGCCAGGCCC CTGGCAAAGG
     GTCGCCGAAG CTGAAGTCGG CCATGACCTA CTCGACCCAC GCGGTCCGGG GACCGTTTCC
2281 CCTGGAATGG ATCGGCGAGA TCAACCCCGA CAGCAGCACC ATCAACTACG CCCCCAGCCT
     GGACCTTACC TAGCCGCTCT AGTTGGGGCT GTCGTCGTGG TAGTTGATGC GGGGGTCGGA
2341 GAAGGACAAG TTCATCATCA GCCGGGACAA CGCCAAGAAC AGCCTGTACC TGCAGATGAA
     CTTCCTGTTC AAGTAGTAGT CGGCCCTGTT GCGGTTCTTG TCGGACATGG ACGTCTACTT
2401 CTCCCTGCGG GCCGAGGACA CCGCCGTGTA CTATTGCGCC AGACCCGACG GCAACTACTG
     GAGGGACGCC CGGCTCCTGT GGCGGCACAT GATAACGCGG TCTGGGCTGC CGTTGATGAC
2461 GTACTTCGAC GTGTGGGGCC AGGGCACCCT CGTGACAGTG TCTAGCGGCA GCACAAGCGG
     CATGAAGCTG CACACCCCGG TCCCGTGGGA GCACTGTCAC AGATCGCCGT CGTGTTCGCC
2521 AGGCGGATCT GGCGGAGGAT CAGGCGGGGG AGGATCCAGC GATATCCAGA TGACCCAGAG
     TCCGCCTAGA CCGCCTCCTA GTCCGCCCCC TCCTAGGTCG CTATAGGTCT ACTGGGTCTC
2581 CCCCAGCAGC CTGTCTGCCA GCGTGGGCGA CAGAGTGACC ATCACATGCA AGGCCAGCCA
     GGGGTCGTCG GACAGACGGT CGCACCCGCT GTCTCACTGG TAGTGTACGT TCCGGTCGGT
2641 GGACGTGGGA ATCGCCGTGG CCTGGTATCA GCAGAAACCC GGCAAGGTGC CCAAGCTGCT
     CCTGCACCCT TAGCGGCACC GGACCATAGT CGTCTTTGGG CCGTTCCACG GGTTCGACGA
2701 GATCTACTGG GCCAGCACCA GACACACCGG CGTGCCCGAT AGATTTTCCG GCAGCGGCTC
     CTAGATGACC CGGTCGTGGT CTGTGTGGCC GCACGGGCTA TCTAAAAGGC CGTCGCCGAG
2761 CGGCACCGAC TTCACCCTGA CAATCAGCTC CCTGCAGCCT GAGGACGTGG CCACCTACTA
     GCCGTGGCTG AAGTGGGACT GTTAGTCGAG GGACGTCGGA CTCCTGCACC GGTGGATGAT
2821 CTGCCAGCAG TACAGCAGCT ACCCCTACAC CTTCGGACAG GGCACCAAGG TGGAAATCAA
     GACGGTCGTC ATGTCGTCGA TGGGGATGTG GAAGCCTGTC CCGTGGTTCC ACCTTTAGTT
2881 AGAGTCTAAG TACGGCCCTC CCTGCCCCCC TTGTCCAGGC GGCGGATCTT CCGGAGGAGG
     TCTCAGATTC ATGCCGGGAG GGACGGGGGG AACAGGTCCG CCGCCTAGAA GGCCTCCTCC
2941 AAGCGGAGGC CAGCCCAGAG AACCTCAGGT GTACACACTG CCCCCTAGCC AGGAAGAGAT
     TTCGCCTCCG GTCGGGTCTC TTGGAGTCCA CATGTGTGAC GGGGGATCGG TCCTTCTCTA
3001 GACCAAGAAT CAGGTGTCCC TGACATGCGG TTCTACCCGT CCGATATCGC
     CTGGTTCTTA GTCCACAGGG ACTGTACGGA GCACTTCCCG AAGATGGGGA GGCTATAGCG
3061 CGTGGAATGG GAGAGCAACG GCCAGCCTGA GAACAACTAC AAGACCACCC CCCCTGTGCT
     GCACCTTACC CTCTCGTTGC CGGTCGGACT CTTGTTGATG TTCTGGTGGG GGGGACACGA
3121 GGACAGCGAC GGCTCATTCT TCCTGTACAG CAGGCTGACC GTGGACAAGA GCCGGTGGCA
     CCTGTCGCTG CCGAGTAAGA AGGACATGTC GTCCGACTGG CACCTGTTCT CGGCCACCGT
3181 GGAAGGCAAC GTGTTCAGCT GCTCCGTGAT GCACGAGGCC CTGCACAACC ACTACACCCA
     CCTTCCGTTG CACAAGTCGA CGAGGCACTA CGTGCTCCGG GACGTGTTGG TGATGTGGGT
3241 GAAGTCCCTG AGCCTGTCCC TGGGCAAGAT GTTCTGGGTG CTGGTGGTCG TGGGCGGCGT
     CTTCAGGGAC TCGGACAGGG ACCCGTTCTA CAAGACCCAC GACCACCAGC ACCGCCGCCA
3301 GCTGGCCTGT TATAGCCTGC TCGTGACCGT GGCCTTCATC ATCTTTTGGG TGCGCAGCAA
     CGACCGGACA ATATCGGACG AGCACTGGCA CCGGAAGTAG TAGAAAACCC ACGCGTCGTT
3361 GCGGAGCAGA GGCGGCCACA CGACTACAT GAACATGACC CCAGACGGC CAGGCCCCAC
     CGCCTCGTCT CCGCCGGTGT CGCTGATGTA CTTGTACTGG GGGTCTGCCG GTCCGGGGTG
3421 CCGGAAACAC TATCAGCCTT ACGCCCCTCC CAGAGACTTC GCCGCTTATC GGTCCGGCGG
     GGCCTTTGTG ATAGTCGGAA TGCGGGGAGG GTCTCTGAAG CGGCGAATAG CCAGGCCGCC
3481 AGGGCGGGTG AAGTTCAGCA GAAGCGCCGA CGCCCCTGCC TACCAGCAGG GCCAGAATCA
     TCCCGCCCAC TTCAAGTCGT CTTCGCGGCT GCGGGGACGG ATGGTCGTCC CGGTCTTAGT
3541 GCTGTACAAC GAGCTGAACC TGGGCAGAAG GGAAGAGTAC GACGTCCTGA ATAAGCGGAA
     CGACATGTTG CTCGACTTGG ACCCGTCTTC CCTTCTCATG CTGCAGGACC TATTCGCCTT
3601 AGGCCGGGAC CCTGAGATGG GCGGCAAGCC TCGGCGGAAG AACCCCCAGG AAGGCCTGTA
     TCCGGCCCTG GGACTCTACC CGCCGTTCGG AGCCGCCTTC TTGGGGTCC TTCCGGACAT
3661 TAACGAACTG CAGAAAGACA AGATGGCCGA GGCCTACAGC GAGATCGGCA TGAAGGGCGA
     ATTGCTTGAC GTCTTTCTGT TCTACCGGCT CCGGATGTCG CTCTAGCCGT ACTTCCCGCT
3721 GCGGAGGCGG GGCAAGGGCC ACGACGGCCT GTATCAGGGC CTGTCCACCG CCACCAAGGA
     CGCCTCCGCC CCGTTCCCGG TGCTGCCGGA CATAGTCCCG GACAGGTGGC GGTGGTTCCT
3781 TACCTACGAC GCCCTGCACA TGCAGGCCCT GCCCCCAAGG CTCGAGGGCG GCGGAGAGGG
     ATGGATGCTG CGGGACGTGT ACGTCCGGGA CGGGGGTTCC GAGCTCCCGC CGCCTCTCCC
3841 CAGAGGAAGT CTTCTAACAT GCGGTGACGT GGAGGAGAAT CCCGGCCCTA GGATGCTTCC
     GTCTCCTTCA GAAGATTGTA CGCCACTGCA CCTCCTCTTA GGGCCGGGAT CCTACGAAGA
```

FIG. 11B

```
3901 CCTGGTGACA AGCCTTCTGC TCTGTGAGTT ACCACACCCA GCATTCCTCC TGATCCCACG
     GGACCACTGT TCGGAAGACG AGACACTCAA TGGTGTGGGT CGTAAGGAGG ACTAGGGTGC
3961 CAAAGTGTGT AACGGAATAG GTATTGGTGA ATTTAAAGAC TCACTCTCCA TAAATGCTAC
     GTTTCACACA TTGCCTTATC CATAACCACT TAAATTTCTG AGTGAGAGGT ATTTACGATG
4021 GAATATTAAA CACTTCAAAA ACTGCACCTC CATCGACCCT GATCTCCACA TCCTGCCGGT
     CTTATAATTT GTGAAGTTTT TGACGTGGAG GTAGTCACCG CTAGAGGTGT AGGACGGCCA
4081 GGCATTTAGG GGTGACTCCT TCACACATAC TCCTCCTCTG GATCCACAGG AACTGGATAT
     CCGTAAATCC CCACTGAGGA AGTGTGTATG AGGAGGAGAC CTAGGTGTCC TTGACCTATA
4141 TCTGAAAACC GTAAAGGAAA TCACAGGGTT TTTGCTGATT CAGGCTTGGC CTGAAAACAG
     AGACTTTTGG CATTTCCTTT AGTGTCCCAA AAACGACTAA GTCCGAACCG GACTTTTGTC
4201 GACGGACCTC CATGCCTTTG AGAACCTAGA AATCATACGC GGCAGGACCA AGCAACATGG
     CTGCCTGGAG GTACGGAAAC TCTTGGATCT TTAGTATGCG CCGTCCTGGT TCGTTGTACC
4261 TCAGTTTTCT CTTGCAGTCG TCAGCCTGAA CATAACATCC TTGGGATTAC GCTCCCTCAA
     AGTCAAAAGA GAACGTCAGC AGTCGGACTT GTATTGTAGG AACCGTAATG CGAGGGAGTT
4321 GGAGATAAGT GATGGAGATG TGATAATTTC AGGAAACAAA AATTTGTGCT ATGCAAATAC
     CCTCTATTCA CTACCTCTAC ACTATTAAAG TCCTTTGTTT TTAAACACGA TACGTTTATG
4381 AATAAACTGG AAAAAACTGT TTGGGACCTC CGGTCAGAAA ACCAAAATTA TAAGCAACAG
     TTATTTGACC TTTTTTGACA AACCCTGGAG GCCAGTCTTT TGGTTTTAAT ATTCGTTGTC
4441 AGGTGAAAAC AGCTGCAAGG CCACAGGCCA GGTCTGCCAT GCCTTGTGCT CCCCCGAGGG
     TCCACTTTTG TCGACGTTCC GGTGTCCGGT CCAGACGGTA CGGAACACGA GGGGGCTCCC
4501 CTGCTGGGGC CCGGAGCCCA GGGACTGCGT CTCTTGCCGG AATGTCAGCC GAGGCAGGGA
     GACGACCCCG GGCCTCGGGT CCCTGACGCA GAGAACGGCC TTACAGTCGG CTCCGTCCCT
4561 ATGCGTGGAC AAGTGCAACC TTCTGGAGGG TGAGCCAAGG GAGTTTGTGG AGAACTCTGA
     TACGCACCTG TTCACGTTGG AAGACCTCCC ACTCGGTTCC CTCAAACACC TCTTGAGACT
4621 GTGCATACAG TGCCACCCAG AGTGCCTGCC TCAGGCCATG AACATCACCT GCACAGGACG
     CACGTATGTC ACGGTGGGTC TCACGGACGG AGTCCGGTAC TTGTAGTGGA CGTGTCCTGC
4681 GGGACCAGAC AACTGTATCC AGTGTGCCCA CTACATTGAC GGCCCCCACT GGTCAAGAC
     CCCTGGTCTG TTGACATAGG TCACACGGGT GATGTAACTG CCGGGGGTGA CGCAGTTCTG
4741 CTGCCCGGCA GGAGTCATGG GAGAAAACAA CACCCTGGTC TGGAAGTACG CAGACGCCGG
     GACGGGCCGT CCTCAGTACC CTCTTTTGTT GTGGGACCAG ACCTTCATGC GTCTGCGGCC
4801 CCATGTGTGC CACCTGTGCC ATCCAAACTG CACCTACGGA TGCACTGGGC CAGGTCTTGA
     GGTACACACG GTGGACACGG TAGGTTTGAC GTGGATGCCT ACGTGACCCG GTCCAGAACT
4861 AGGCTGTCCA ACGAATGGGC CTAAGATCCC GTCCATCGCC ACTGGGATGG TGGGGCCCT
     TCCGACAGGT TGCTTACCCG GATTCTAGGG CAGGTAGCGG TGACCCTACC ACCCCCGGGA
4921 CCTCTTGCTG CTGGTGGTGG CCCTGGGGAT CGGCCTCTTC ATGTGAGCGG CCGCTCTAGA
     GGAGAACGAC GACCACCACC GGGACCCCTA GCCGGAGAAG TACACTCGCC GGCGAGATCT
4981 CCCGGGCTGC AGGAATTCGA TATCAAGCTT ATCGATAATC AACCTCTGGA TTACAAAATT
     GGGCCCGACG TCCTTAAGCT ATAGTTCGAA TAGCTATTAG TTGGAGACCT AATGTTTTAA
5041 TGTGAAAGAT TGACTGGTAT TCTTAACTAT GTTGCTCCTT TTACGCTATG TGGATACGCT
     ACACTTTCTA ACTGACCATA AGAATTGATA CAACGAGGAA AATGCGATAC ACCTATGCGA
5101 GCTTTAATGC CTTTGTATCA TGCTATTGCT TCCCGTATGG CTTTCATTTT CTCCTCCTTG
     CGAAATTACG GAAACATAGT ACGATAACGA AGGGCATACC GAAAGTAAAA GAGGAGGAAC
5161 TATAAATCCT GGTTGCTGTC TCTTTATGAG GAGTTGTGGC CCGTTGTCAG GCAACGTGGC
     ATATTTAGGA CCAACGACAG AGAAATACTC CTCAACACCG GGCAACAGTC CGTTGCACCG
5221 GTGGTGTGCA CTGTGTTTGC TGACGCAACC CCCACTGGTT GGGGCATTGC CACCACCTGT
     CACCACACGT GACACAAACG ACTGCGTTGG GGGTGACCAA CCCCGTAACG GTGGTGGACA
5281 CAGCTCCTTT CCGGGACTTT CGCTTTCCCC CTCCCTATTG CCACGGCGGA ACTCATCGCC
     GTCGAGGAAA GGCCCTGAAA GCGAAAGGGG GAGGGATAAC GGTGCCGCCT TGAGTAGCGG
5341 GCCTGCCTTG CCCGCTGCTG GACAGGGGCT CGGCTGTTGG GCACTGACAA TTCCGTGGTG
     CGGACGGAAC GGGCGACGAC CTGTCCCCGA GCCGACAACC CGTGACTGTT AAGGCACCAC
5401 TTGTCGGGGA AATCATCGTC CTTTCCTTGG CTGCTCGCCT GTGTTGCCAC CTGGATTCTG
     AACAGCCCCT TTAGTAGCAG GAAAGGAACC GACGAGCGGA CACAACGGTG GACCTAAGAC
5461 CGCGGGACGT CCTTCTGCTA CGTCCCTTCG CCCTCAATC CAGCGGACCT TCCTTCCCGC
     GCGCCCTGCA GGAAGACGAT GCAGGGAAGC GGGAGTTAG GTCGCCTGGA AGGAAGGGCG
5521 GGCCTGCTGC CGGCTCTGCG GCCTCTTCCG CGTCTTCGCC TTCGCCCTCA GACGAGTCGG
     CCGGACGACG GCCGAGACGC CGGAGAAGGC GCAGAAGCGG AAGCGGGAGT CTGCTCAGCC
5581 ATCTCCCTTT GGGCCGCCTC CCCGCATCGA TACCGTCGAC TAGCCGTACC TTTAAGACCA
     TAGAGGGAAA CCCGGCGGAG GGGCGTAGCT ATGGCAGCTG ATCGGCATGG AAATTCTGGT
5641 ATGACTTACA AGGCAGCTGT AGATCTTAGC CACTTTTTAA AAGAAAAGGG GGGACTGGAA
     TACTGAATGT TCCGTCGACA TCTAGAATCG GTGAAAAATT TTCTTTTCCC CCCTGACCTT
5701 GGGCTAATTC ACTCCCAAAG AAGACAAGAT CTGCTTTTTG CCTGTACTGG GTCTCTCTGG
     CCCGATTAAG TGAGGGTTTC TTCTGTTCTA GACGAAAAAC GGACATGACC CAGAGAGACC
5761 TTAGACCAGA TCTGAGCCTG GGAGCTCTCT GGCTAACTAG GAACCCACT GCTTAAGCCT
     AATCTGGTCT AGACTCGGAC CCTCGAGAGA CCGATTGATC CCTTGGGTGA CGAATTCGGA
5821 CAATAAAGCT TGCCTTGAGT GCTTCAAGTA GTGTGTGCCC GTCTGTTGTG TGACTCTGGT
```

FIG. 11C

```
       GTTATTTCGA ACGGAACTCA CGAAGTTCAT CACACACGGG CAGACAACAC ACTGAGACCA
5881   AACTAGAGAT CCCTCAGACC CTTTTAGTCA GTGTGGAAAA TCTCTAGCAG AATTCGATAT
       TTGATCTCTA GGGAGTCTGG GAAAATCAGT CACACCTTTT AGAGATCGTC TTAAGCTATA
5941   CAAGCTTATC GATACCGTCG ACCTCGAGGG GGGGCCCGGT ACCCAATTCG CCCTATAGTG
       GTTCGAATAG CTATGGCAGC TGGAGCTCCC CCCCGGGCCA TGGGTTAAGC GGGATATCAC
6001   AGTCGTATTA CAATTCACTG GCCGTCGTTT TACAACGTCG TGACTGGGAA AACCCTGGCG
       TCAGCATAAT GTTAAGTGAC CGGCAGCAAA ATGTTGCAGC ACTGACCCTT TTGGGACCGC
6061   TTACCCAACT TAATCGCCTT GCAGCACATC CCCCTTTCGC CAGCTGGCGT AATAGCGAAG
       AATGGGTTGA ATTAGCGGAA CGTCGTGTAG GGGGAAAGCG GTCGACCGCA TTATCGCTTC
6121   AGGCCCGCAC CGATCGCCCT TCCCAACAGT TGCGCAGCCT GAATGGCGAA TGGAAATTGT
       TCCGGGCGTG GCTAGCGGGA AGGGTTGTCA ACGCGTCGGA CTTACCGCTT ACCTTTAACA
6181   AAGCGTTAAT ATTTTGTTAA AATTCGCGTT AAATTTTTGT TAAATCAGCT CATTTTTTAA
       TTCGCAATTA TAAAACAATT TTAAGCGCAA TTTAAAAACA ATTTAGTCGA GTAAAAAATT
6241   CCAATAGGCC GAAATCGGCA AAATCCCTTA TAAATCAAAA GAATAGACCG AGATAGGGTT
       GGTTATCCGG CTTTAGCCGT TTTAGGGAAT ATTTAGTTTT CTTATCTGGC TCTATCCCAA
6301   GAGTGTTGTT CCAGTTTGGA ACAAGAGTCC ACTATTAAAG AACGTGGACT CCAACGTCAA
       CTCACAACAA GGTCAAACCT TGTTCTCAGG TGATAATTTC TTGCACCTGA GGTTGCAGTT
6361   AGGGCGAAAA ACCGTCTATC AGGGCGATGG CCCACTACGT GAACCATCAC CCTAATCAAG
       TCCCGCTTTT TGGCAGATAG TCCCGCTACC GGGTGATGCA CTTGGTAGTG GGATTAGTTC
6421   TTTTTTGGGG TCGAGGTGCC GTAAAGCACT AAATCGGAAC CCTAAAGGGA GCCCCCGATT
       AAAAAACCCC AGCTCCACGG CATTTCGTGA TTTAGCCTTG GGATTTCCCT CGGGGGCTAA
6481   TAGAGCTTGA CGGGGAAAGC CGGCGAACGT GGCGAGAAAG GAAGGGAAGA AAGCGAAAGG
       ATCTCGAACT GCCCCTTTCG GCCGCTTGCA CCGCTCTTTC CTTCCCTTCT TTCGCTTTCC
6541   AGCGGGCGCT AGGGCGCTGG CAAGTGTAGC GGTCACGCTG CGCGTAACCA CCACACCCGC
       TCGCCCGCGA TCCCGCGACC GTTCACATCG CCAGTGCGAC GCGCATTGGT GGTGTGGGCG
6601   CGCGCTTAAT GCGCCGCTAC AGGGCGCGTC AGGTGGCACT TTTCGGGGAA ATGTGCGCGG
       GCGCGAATTA CGCGGCGATG TCCCGCGCAG TCCACCGTGA AAAGCCCCTT TACACGCGCC
6661   AACCCCTATT TGTTTATTTT TCTAAATACA TTCAAATATG TATCCGCTCA TGAGACAATA
       TTGGGGATAA ACAAATAAAA AGATTTATGT AAGTTTATAC ATAGGCGAGT ACTCTGTTAT
6721   ACCCTGATAA ATGCTTCAAT AATATTGAAA AAGGAAGAGT ATGAGTATTC AACATTTCCG
       TGGGACTATT TACGAAGTTA TTATAACTTT TTCCTTCTCA TACTCATAAG TTGTAAAGGC
6781   TGTCGCCCTT ATTCCCTTTT TTGCGGCATT TTGCCTTCCT GTTTTTGCTC ACCCAGAAAC
       ACAGCGGGAA TAAGGGAAAA AACGCCGTAA AACGGAAGGA CAAAAACGAG TGGGTCTTTG
6841   GCTGGTGAAA GTAAAAGATG CTGAAGATCA GTTGGGTGCA CGAGTGGGTT ACATCGAACT
       CGACCACTTT CATTTTCTAC GACTTCTAGT CAACCCACGT GCTCACCCAA TGTAGCTTGA
6901   GGATCTCAAC AGCGGTAAGA TCCTTGAGAG TTTTCGCCCC GAAGAACGTT TTCCAATGAT
       CCTAGAGTTG TCGCCATTCT AGGAACTCTC AAAAGCGGGG CTTCTTGCAA AAGGTTACTA
6961   GAGCACTTTT AAAGTTCTGC TATGTGGCGC GGTATTATCC CGTATTGACG CCGGGCAAGA
       CTCGTGAAAA TTTCAAGACG ATACACCGCG CCATAATAGG GCATAACTGC GGCCCGTTCT
7021   GCAACTCGGT CGCCGCATAC ACTATTCTCA GAATGACTTG GTTGAGTACT CACCAGTCAC
       CGTTGAGCCA GCGGCGTATG TGATAAGAGT CTTACTGAAC CAACTCATGA GTGGTCAGTG
7081   AGAAAAGCAT CTTACGGATG GCATGACAGT AAGAGAATTA TGCAGTGCTG CCATAACCAT
       TCTTTTCGTA GAATGCCTAC CGTACTGTCA TTCTCTTAAT ACGTCACGAC GGTATTGGTA
7141   GAGTGATAAC ACTGCGGCCA ACTTACTTCT GACAACGATC GGAGGACCGA AGGAGCTAAC
       CTCACTATTG TGACGCCGGT TGAATGAAGA CTGTTGCTAG CCTCCTGGCT TCCTCGATTG
7201   CGCTTTTTTG CACAACATGG GGGATCATGT AACTCGCCTT GATCGTTGGG AACCGGAGCT
       GCGAAAAAAC GTGTTGTACC CCCTAGTACA TTGAGCGGAA CTAGCAACCC TTGGCCTCGA
7261   GAATGAAGCC ATACCAAACG ACGAGCGTGA CACCACGATG CCTGTAGCAA TGGCAACAAC
       CTTACTTCGG TATGGTTTGC TGCTCGCACT GGACACGTCA TTACCGTTGTTG ACCGTTGTTG
7321   GTTGCGCAAA CTATTAACTG GCGAACTACT TACTCTAGCT TCCCGGCAAC AATTAATAGA
       CAACGCGTTT GATAATTGAC CGCTTGATGA ATGAGATCGA AGGGCCGTTG TTAATTATCT
7381   CTGGATGGAG GCGGATAAAG TTGCAGGACC ACTTCTGCGC TCGGCCCTTC CGGCTGGCTG
       GACCTACCTC CGCCTATTTC AACGTCCTGG TGAAGACGCG AGCCGGGAAG GCCGACCGAC
7441   GTTTATTGCT GATAAATCTG GAGCCGGTGA GCGTGGGTCT CGCGGTATCA TTGCAGCACT
       CAAATAACGA CTATTTAGAC CTCGGCCACT CGCACCCAGA GCGCCATAGT AACGTCGTGA
7501   GGGGCCAGAT GGTAAGCCCT CCCGTATCGT AGTTATCTAC ACGACGGGGA GTCAGGCAAC
       CCCCGGTCTA CCATTCGGGA GGGCATAGCA TCAATAGATG TGCTGCCCCT CAGTCCGTTG
7561   TATGGATGAA CGAAATAGAC AGATCGCTGA GATAGGTGCC TCACTGATTA AGCATTGGTA
       ATACCTACTT GCTTTATCTG TCTAGCGACT CTATCCACGG AGTGACTAAT TCGTAACCAT
7621   ACTGTCAGAC CAAGTTTACT CATATATACT TTAGATTGAT TTAAAACTTC ATTTTTAATT
       TGACAGTCTG GTTCAAATGA GTATATATGA AATCTAACTA AATTTTGAAG TAAAAATTAA
7681   TAAAGGATC TAGGTGAAGA TCCTTTTTGA TAATCTCATG ACCAAAATCC CTTAACGTGA
       ATTTCCTAG ATCCACTTCT AGGAAAAACT ATTAGAGTAC TGGTTTTAGG GAATTGCACT
7741   GTTTTCGTTC CACTGAGCGT CAGACCCCGT AGAAAAGATC AAAGGATCTT CTTGAGATCC
       CAAAAGCAAG GTGACTCGCA GTCTGGGGCA TCTTTTCTAG TTTCCTAGAA GAACTCTAGG
```

FIG. 11D

```
7801 TTTTTTTCTG CGCGTAATCT GCTGCTTGCA AACAAAAAAA CCACCGCTAC CAGCGGTGGT
     AAAAAAAGAC GCGCATTAGA CGACGAACGT TTGTTTTTTT GGTGGCGATG GTCGCCACCA
7861 TTGTTTGCCG GATCAAGAGC TACCAACTCT TTTTCCGAAG GTAACTGGCT TCAGCAGAGC
     AACAAACGGC CTAGTTCTCG ATGGTTGAGA AAAAGGCTTC CATTGACCGA AGTCGTCTCG
7921 GCAGATACCA AATACTGTTC TTCTAGTGTA GCCGTAGTTA GGCCACCACT TCAAGAACTC
     CGTCTATGGT TTATGACAAG AAGATCACAT CGGCATCAAT CCGGTGGTGA AGTTCTTGAG
7981 TGTAGCACCG CCTACATACC TCGCTCTGCT AATCCTGTTA CCAGTGGCTG CTGCCAGTGG
     ACATCGTGGC GGATGTATGG AGCGAGACGA TTAGGACAAT GGTCACCGAC GACGGTCACC
8041 CGATAAGTCG TGTCTTACCG GGTTGGACTC AAGACGATAG TTACCGGATA AGGCGCAGCG
     GCTATTCAGC ACAGAATGGC CCAACCTGAG TTCTGCTATC AATGGCCTAT TCCGCGTCGC
8101 GTCGGGCTGA ACGGGGGGTT CGTGCACACA GCCCAGCTTG GAGCGAACGA CCTACACCGA
     CAGCCCGACT TGCCCCCCAA GCACGTGTGT CGGGTCGAAC CTCGCTTGCT GGATGTGGCT
8161 ACTGAGATAC CTACAGCGTG AGCTATGAGA AAGCGCCACG CTTCCCGAAG GGAGAAAGGC
     TGACTCTATG GATGTCGCAC TCGATACTCT TTCGCGGTGC GAAGGGCTTC CCTCTTTCCG
8221 GGACAGGTAT CCGGTAAGCG GCAGGGTCGG AACAGGAGAG CGCACGAGGG AGCTTCCAGG
     CCTGTCCATA GGCCATTCGC CGTCCCAGCC TTGTCCTCTC GCGTGCTCCC TCGAAGGTCC
8281 GGGAAACGCC TGGTATCTTT ATAGTCCTGT CGGGTTTCGC CACCTCTGAC TTGAGCGTCG
     CCCTTTGCGG ACCATAGAAA TATCAGGACA GCCCAAAGCG GTGGAGACTG AACTCGCAGC
8341 ATTTTTGTGA TGCTCGTCAG GGGGGCGGAG CCTATGGAAA AACGCCAGCA ACGCGGCCTT
     TAAAAACACT ACGAGCAGTC CCCCCGCCTC GGATACCTTT TTGCGGTCGT TGCGCCGGAA
8401 TTTTACGGTT CTGGCCTTTT GCTGGCCTTT TGCTCACATG TTCTTTCCTG CGTTATCCCC
     AAATGCCAAG GACCGGAAAA CGACCGGAAA ACGAGTGTAC AAGAAAGGAC GCAATAGGGG
8461 TGATTCTGTG GATAACCGTA TTACCGCCTT TGAGTGAGCT GATACCGCTC GCCGCAGCCG
     ACTAAGACAC CTATTGGCAT AATGGCGGAA ACTCACTCGA CTATGGCGAG CGGCGTCGGC
8521 AACGACCGAG CGCAGCGAGT CAGTGAGCGA GGAAGCGGAA GAGCGCCCAA TACGCAAACC
     TTGCTGGCTC GCGTCGCTCA GTCACTCGCT CCTTCGCCTT CTCGCGGGTT ATGCGTTTGG
8581 GCCTCTCCCC GCGCGTTGGC CGATTCATTA ATGCAGCTGG CACGACAGGT TTCCCGACTG
     CGGAGAGGGG CGCGCAACCG GCTAAGTAAT TACGTCGACC GTGCTGTCCA AAGGGCTGAC
8641 GAAAGCGGGC AGTGAGCGCA ACGCAATTAA TGTGAGTTAG CTCACTCATT AGGCACCCCA
     CTTTCGCCCG TCACTCGCGT TGCGTTAATT ACACTCAATC GAGTGAGTAA TCCGTGGGGT
8701 GGCTTTACAC TTTATGCTTC CGGCTCGTAT GTTGTGTGGA ATTGTGAGCG GATAACAATT
     CCGAAATGTG AAATACGAAG GCCGAGCATA CAACACACCT TAACACTCGC CTATTGTTAA
8761 TCACACAGGA AACAGCTATG ACCATGATTA CGCCAAGCTC GAAATTAACC CTCACTAAAG
     AGTGTGTCCT TTGTCGATAC TGGTACTAAT GCGGTTCGAG CTTTAATTGG GAGTGATTTC
8821 GGAACAAAAG CTGGAGCTCC ACCGCGGTGG CGGCCTCGAG GTCGAGATCC GGTCGACCAG
     CCTTGTTTTC GACCTCGAGG TGGCGCCACC GCCGGAGCTC CAGCTCTAGG CCAGCTGGTC
8881 CAACCATAGT CCCGCCCCTA ACTCCGCCCA TCCCGCCCCT AACTCCGCCC AGTTCCGCCC
     GTTGGTATCA GGGCGGGGAT TGAGGCGGGT AGGGCGGGGA TTGAGGCGGG TCAAGGCGGG
8941 ATTCTCCGCC CCATGGCTGA CTAATTTTTT TTATTTATGC AGAGGCCGAG GCCGCCTCGG
     TAAGAGGCGG GGTACCGACT GATTAAAAAA AATAAATACG TCTCCGGCTC CGGCGGAGCC
9001 CCTCTGAGCT ATTCCAGAAG TAGTGAGGAG GCTTTTTTGG AGGCCTAGGC TTTTGCAAAA
     GGAGACTCGA TAAGGTCTTC ATCACTCCTC CGAAAAAACC TCCGGATCCG AAAACGTTTT
9061 AGCTTCGACG GTATCGATTG GCTCATGTCC AACATTACCG CCATGTTGAC ATTGATTATT
     TCGAAGCTGC CATAGCTAAC CGAGTACAGG TTGTAATGGC GGTACAACTG TAACTAATAA
9121 GACTAGTTAT TAATAGTAAT CAATTACGGG GTCATTAGTT CATAGCCCAT ATATGGAGTT
     CTGATCAATA ATTATCATTA GTTAATGCCC CAGTAATCAA GTATCGGGTA TATACCTCAA
9181 CCGCGTTACA TAACTTACGG TAAATGGCCC GCCTGGCTGA CCGCCCAACG ACCCCCGCCC
     GGCGCAATGT ATTGAATGCC ATTTACCGGG CGGACCGACT GGCGGGTTGC TGGGGGCGGG
9241 ATTGACGTCA ATAATGACGT ATGTTCCCAT ATAGGGACTT TCCATTGACG
     TAACTGCAGT TATTACTGCA TACAAGGGTA TCATTGCGGT TATCCCTGAA AGGTAACTGC
9301 TCAATGGGTG GAGTATTTAC GGTAAACTGC CCACTTGGCA GTACATCAAG TGTATCATAT
     AGTTACCCAC CTCATAAATG CCATTTGACG GGTGAACCGT CATGTAGTTC ACATAGTATA
9361 GCCAAGTACG CCCCCTATTG ACGTCAATGA CGGTAAATGG CCCGCCTGGC ATTATGCCCA
     CGGTTCATGC GGGGGATAAC TGCAGTTACT GCCATTTACC GGGCGGACCG TAATACGGGT
9421 GTACATGACC TTATGGGACT TTCCTACTTG GCAGTACATC TACGTATTAG TCATCGCTAT
     CATGTACTGG AATACCCTGA AAGGATGAAC CGTCATGTAG ATGCATAATC AGTAGCGATA
9481 TACCATGGTG ATGCGGTTTT GGCAGTACAT CAATGGGCGT GGATAGCGGT TTGACTCACG
     ATGGTACCAC TACGCCAAAA CCGTCATGTA GTTACCCGCA CCTATCGCCA AACTGAGTGC
9541 GGGATTTCCA AGTCTCCACC CCATTGACGT CAATGGGAGT TTGTTTTGGC ACCAAAATCA
     CCCTAAAGGT TCAGAGGTGG GGTAACTGCA GTTACCCTCA AACAAAACCG TGGTTTTAGT
9601 ACGGGACTTT CCAAAATGTC GTAACAACTC CGCCCCATTG ACGCAAATGG GCGGTAGGCG
     TGCCCTGAAA GGTTTTACAG CATTGTTGAG GCGGGGTAAC TGCGTTTACC CGCCATCCGC
9661 TGTACGGAAT TCGGAGTGGC GAGCCCTCAG ATCCTGCATA TAAGCAGCTG CTTTTTGCCT
     ACATGCCTTA AGCCTCACCG CTCGGGAGTC TAGGACGTAT ATTCGTCGAC GAAAACGGA
9721 GTACTGGGTC TCTCTG
     CATGACCCAG AGAGAC
```

FIG. 11E

SEQUENCE LISTING

```
Sequence total quantity: 47
SEQ ID NO: 1            moltype = AA  length = 244
FEATURE                 Location/Qualifiers
source                  1..244
                        mol_type = protein
                        organism = Homo sapiens
SEQUENCE: 1
EVQLVESGGG LVQPGGSLRL SCAASGFDFS RYWMSWVRQA PGKGLEWIGE INPDSSTINY  60
APSLKDKFII SRDNAKNSLY LQMNSLRAED TAVYYCARPD GNYWYFDVWG QGTLVTVSSG 120
STSGGGSGGG SGGGGSSDIQ MTQSPSSLSA SVGDRVTITC KASQDVGIAV AWYQQKPGKV 180
PKLLIYWAST RHTGVPDRFS GSGSGTDFTL TISSLQPEDV ATYYCQQYSS YPYTFGQGTK 240
VEIK                                                              244

SEQ ID NO: 2            moltype = AA  length = 10
FEATURE                 Location/Qualifiers
source                  1..10
                        mol_type = protein
                        organism = Synthetic construct
SEQUENCE: 2
GGGSSGGGSG                                                         10

SEQ ID NO: 3            moltype = AA  length = 12
FEATURE                 Location/Qualifiers
source                  1..12
                        mol_type = protein
                        organism = Synthetic construct
SEQUENCE: 3
ESKYGPPCPP CP                                                      12

SEQ ID NO: 4            moltype = AA  length = 12
FEATURE                 Location/Qualifiers
source                  1..12
                        mol_type = protein
                        organism = Synthetic construct
SEQUENCE: 4
ESKYGPPCPS CP                                                      12

SEQ ID NO: 5            moltype = AA  length = 22
FEATURE                 Location/Qualifiers
source                  1..22
                        mol_type = protein
                        organism = Synthetic construct
SEQUENCE: 5
ESKYGPPCPP CPGGGSSGGG SG                                           22

SEQ ID NO: 6            moltype = AA  length = 39
FEATURE                 Location/Qualifiers
source                  1..39
                        mol_type = protein
                        organism = Synthetic construct
SEQUENCE: 6
IEVMYPPPYL DNEKSNGTII HVKGKHLCPS PLFPGPSKP                         39

SEQ ID NO: 7            moltype = AA  length = 48
FEATURE                 Location/Qualifiers
source                  1..48
                        mol_type = protein
                        organism = Synthetic construct
SEQUENCE: 7
AKPTTTPAPR PPTPAPTIAS QPLSLRPEAC RPAAGGAVHT RGLDFACD               48

SEQ ID NO: 8            moltype = AA  length = 45
FEATURE                 Location/Qualifiers
source                  1..45
                        mol_type = protein
                        organism = Synthetic construct
SEQUENCE: 8
TTTPAPRPPT PAPTIASQPL SLRPEACRPA AGGAVHTRGL DFACD                  45

SEQ ID NO: 9            moltype = AA  length = 129
FEATURE                 Location/Qualifiers
source                  1..129
```

```
                        mol_type = protein
                        organism = Synthetic construct
SEQUENCE: 9
ESKYGPPCPP CPGGGSSGGG SGGQPREPQV YTLPPSQEEM TKNQVSLTCL VKGFYPSDIA    60
VEWESNGQPE NNYKTTPPVL DSDGSFFLYS RLTVDKSRWQ EGNVFSCSVM HEALHNHYTQ   120
KSLSLSLGK                                                          129

SEQ ID NO: 10           moltype = AA  length = 229
FEATURE                 Location/Qualifiers
source                  1..229
                        mol_type = protein
                        organism = Synthetic construct
SEQUENCE: 10
ESKYGPPCPS CPAPEFEGGP SVFLFPPKPK DTLMISRTPE VTCVVVDVSQ EDPEVQFNWY    60
VDGVEVHQAK TKPREEQFQS TYRVVSVLTV LHQDWLNGKE YKCKVSNKGL PSSIEKTISK   120
AKGQPREPQV YTLPPSQEEM TKNQVSLTCL VKGFYPSDIA VEWESNGQPE NNYKTTPPVL   180
DSDGSFFLYS RLTVDKSRWQ EGNVFSCSVM HEALHNHYTQ KSLSLSLGK               229

SEQ ID NO: 11           moltype = AA  length = 229
FEATURE                 Location/Qualifiers
source                  1..229
                        mol_type = protein
                        organism = Synthetic construct
SEQUENCE: 11
ESKYGPPCPP CPAPEFEGGP SVFLFPPKPK DTLMISRTPE VTCVVVDVSQ EDPEVQFNWY    60
VDGVEVHQAK TKPREEQFQS TYRVVSVLTV LHQDWLNGKE YKCKVSNKGL PSSIEKTISK   120
AKGQPREPQV YTLPPSQEEM TKNQVSLTCL VKGFYPSDIA VEWESNGQPE NNYKTTPPVL   180
DSDGSFFLYS RLTVDKSRWQ EGNVFSCSVM HEALHNHYTQ KSLSLSLGK               229

SEQ ID NO: 12           moltype = AA  length = 107
FEATURE                 Location/Qualifiers
source                  1..107
                        mol_type = protein
                        organism = Homo sapiens
SEQUENCE: 12
GQPREPQVYT LPPSQEEMTK NQVSLTCLVK GFYPSDIAVE WESNGQPENN YKTTPPVLDS    60
DGSFFLYSRL TVDKSRWQEG NVFSCSVMHE ALHNHYTQKS LSLSLGK                 107

SEQ ID NO: 13           moltype = AA  length = 21
FEATURE                 Location/Qualifiers
source                  1..21
                        mol_type = protein
                        organism = Synthetic construct
SEQUENCE: 13
LCYLLDGILF IYGVILTALF L                                             21

SEQ ID NO: 14           moltype = AA  length = 27
FEATURE                 Location/Qualifiers
source                  1..27
                        mol_type = protein
                        organism = Synthetic construct
SEQUENCE: 14
FWVLVVVGGV LACYSLLVTV AFIIFWV                                       27

SEQ ID NO: 15           moltype = AA  length = 28
FEATURE                 Location/Qualifiers
source                  1..28
                        mol_type = protein
                        organism = Synthetic construct
SEQUENCE: 15
MFWVLVVVGG VLACYSLLVT VAFIIFWV                                      28

SEQ ID NO: 16           moltype = AA  length = 22
FEATURE                 Location/Qualifiers
source                  1..22
                        mol_type = protein
                        organism = Synthetic construct
SEQUENCE: 16
MALIVLGGVA GLLLFIGLGI FF                                            22

SEQ ID NO: 17           moltype = AA  length = 21
FEATURE                 Location/Qualifiers
source                  1..21
                        mol_type = protein
                        organism = Synthetic construct
SEQUENCE: 17
IYIWAPLAGT CGVLLLSLVI T                                             21

SEQ ID NO: 18           moltype = AA  length = 23
```

```
FEATURE                 Location/Qualifiers
source                  1..23
                        mol_type = protein
                        organism = Synthetic construct
SEQUENCE: 18
IYIWAPLAGT CGVLLLSLVI TLY                                           23

SEQ ID NO: 19           moltype = AA  length = 24
FEATURE                 Location/Qualifiers
source                  1..24
                        mol_type = protein
                        organism = Synthetic construct
SEQUENCE: 19
IYIWAPLAGT CGVLLLSLVI TLYC                                          24

SEQ ID NO: 20           moltype = AA  length = 27
FEATURE                 Location/Qualifiers
source                  1..27
                        mol_type = protein
                        organism = Synthetic construct
SEQUENCE: 20
IISFFLALTS TALLFLLFFL TLRFSVV                                       27

SEQ ID NO: 21           moltype = AA  length = 112
FEATURE                 Location/Qualifiers
source                  1..112
                        mol_type = protein
                        organism = Synthetic construct
SEQUENCE: 21
RVKFSRSADA PAYQQGQNQL YNELNLGRRE EYDVLDKRRG RDPEMGGKPR RKNPQEGLYN    60
ELQKDKMAEA YSEIGMKGER RRGKGHDGLY QGLSTATKDT YDALHMQALP PR          112

SEQ ID NO: 22           moltype = AA  length = 41
FEATURE                 Location/Qualifiers
source                  1..41
                        mol_type = protein
                        organism = Synthetic construct
SEQUENCE: 22
RSKRSRLLHS DYMNMTPRRP GPTRKHYQPY APPRDFAAYR S                        41

SEQ ID NO: 23           moltype = AA  length = 41
FEATURE                 Location/Qualifiers
source                  1..41
                        mol_type = protein
                        organism = Synthetic construct
SEQUENCE: 23
RSKRSRGGHS DYMNMTPRRP GPTRKHYQPY APPRDFAAYR S                        41

SEQ ID NO: 24           moltype = AA  length = 42
FEATURE                 Location/Qualifiers
source                  1..42
                        mol_type = protein
                        organism = Synthetic construct
SEQUENCE: 24
KRGRKKLLYI FKQPFMRPVQ TTQEEDGCSC RFPEEEEGGC EL                       42

SEQ ID NO: 25           moltype = AA  length = 42
FEATURE                 Location/Qualifiers
source                  1..42
                        mol_type = protein
                        organism = Synthetic construct
SEQUENCE: 25
ALYLLRRDQR LPPDAHKPPG GGSFRTPIQE EQADAHSTLA KI                       42

SEQ ID NO: 26           moltype = AA  length = 22
FEATURE                 Location/Qualifiers
source                  1..22
                        mol_type = protein
                        organism = Homo sapiens
SEQUENCE: 26
MLLLVTSLLL CELPHPAFLL IP                                            22

SEQ ID NO: 27           moltype = AA  length = 24
FEATURE                 Location/Qualifiers
source                  1..24
                        mol_type = protein
                        organism = Synthetic construct
SEQUENCE: 27
LEGGGEGRGS LLTCGDVEEN PGPR                                          24
```

```
SEQ ID NO: 28            moltype = AA  length = 354
FEATURE                  Location/Qualifiers
source                   1..354
                         mol_type = protein
                         organism = Synthetic construct
SEQUENCE: 28
LVTSLLLCEL PHPAFLLIPR KVCNGIGIGE FKDSLSINAT NIKHFKNCTS ISGDLHILPV   60
AFRGDSFTHT PPLDPQELDI LKTVKEITGF LLIQAWPENR TDLHAFENLE IIRGRTKQHG  120
QFSLAVVSLN ITSLGLRSLK EISDGDVIIS GNKNLCYANT INWKKLFGTS GQKTKIISNR  180
GENSCKATGQ VCHALCSPEG CWGPEPRDCV SCRNVSRGRE CVDKCNLLEG EPREFVENSE  240
CIQCHPECLP QAMNITCTGR GPDNCIQCAH YIDGPHCVKT CPAGVMGENN TLVWKYADAG  300
HVCHLCHPNC TYGCTPGPLE GCPTNGPKIP SIATGMVGAL LLLLVVALGI GLFM        354

SEQ ID NO: 29            moltype = AA  length = 960
FEATURE                  Location/Qualifiers
source                   1..960
                         mol_type = protein
                         organism = Synthetic construct
SEQUENCE: 29
MLLLVTSLLL CELPHPAFLL IPEVQLVESG GGLVQPGGSL RLSCAASGFD FSRYWMSWVR   60
QAPGKGLEWI GEINPDSSTI NYAPSLKDKF IISRDNAKNS LYLQMNSLRA EDTAVYYCAR  120
PDGNYWYFDV WGQGTLVTVS SGSTSGGGSG GGSGGGGSSD IQMTQSPSSL SASVGDRVTI  180
TCKASQDVGI AVAWYQQKPG KVPKLLIYWA STRHTGVPDR FSGSGSGTDF TLTISSLQPE  240
DVATYYCQQY SSYPYTFGQG TKVEIKESKY GPPCPPCPGG GSSGGGSGGQ PREPQVYTLP  300
PSQEEMTKNQ VSLTCLVKGF YPSDIAVEWE SNGQPENNYK TTPPVLDSDG SFFLYSRLTV  360
DKSRWQEGNV FSCSVMHEAL HNHYTQKSLS LSLGKMFWVL VVVGGVLACY SLLVTVAFII  420
FWVRSKRSRG GHSDYMNMTP RRPGPTRKHY QPYAPPRDFA AYRSGGGRVK FSRSADAPAY  480
QQGQNQLYNE LNLGRREEYD VLDKRRGRDP EMGGKPRRKN PQEGLYNELQ KDKMAEAYSE  540
IGMKGERRRG KGHDGLYQGL STATKDTYDA LHMQALPPRL EGGGEGRGSL LTCGDVEENP  600
GPRMLLLVTS LLLCELPHPA FLLIPRKVCN GIGIGEFKDS LSINATNIKH FKNCTSISGD  660
LHILPVAFRG DSFTHTPPLD PQELDILKTV KEITGFLLIQ AWPENRTDLH AFENLEIIRG  720
RTKQHGQFSL AVVSLNITSL GLRSLKEISD GDVIISGNKN LCYANTINWK KLFGTSGQKT  780
KIISNRGENS CKATGQVCHA LCSPEGCWGP EPRDCVSCRN VSRGRECVDK CNLLEGEPRE  840
FVENSECIQC HPECLPQAMN ITCTGRGPDN CIQCAHYIDG PHCVKTCPAG VMGENNTLVW  900
KYADAGHVCH LCHPNCTYGC TGPGLEGCPT NGPKIPSIAT GMVGALLLLL VVALGIGLFM  960

SEQ ID NO: 30            moltype = AA  length = 579
FEATURE                  Location/Qualifiers
source                   1..579
                         mol_type = protein
                         organism = Synthetic construct
SEQUENCE: 30
MLLLVTSLLL CELPHPAFLL IPEVQLVESG GGLVQPGGSL RLSCAASGFD FSRYWMSWVR   60
QAPGKGLEWI GEINPDSSTI NYAPSLKDKF IISRDNAKNS LYLQMNSLRA EDTAVYYCAR  120
PDGNYWYFDV WGQGTLVTVS SGSTSGGGSG GGSGGGGSSD IQMTQSPSSL SASVGDRVTI  180
TCKASQDVGI AVAWYQQKPG KVPKLLIYWA STRHTGVPDR FSGSGSGTDF TLTISSLQPE  240
DVATYYCQQY SSYPYTFGQG TKVEIKESKY GPPCPPCPGG GSSGGGSGGQ PREPQVYTLP  300
PSQEEMTKNQ VSLTCLVKGF YPSDIAVEWE SNGQPENNYK TTPPVLDSDG SFFLYSRLTV  360
DKSRWQEGNV FSCSVMHEAL HNHYTQKSLS LSLGKMFWVL VVVGGVLACY SLLVTVAFII  420
FWVRSKRSRG GHSDYMNMTP RRPGPTRKHY QPYAPPRDFA AYRSGGGRVK FSRSADAPAY  480
QQGQNQLYNE LNLGRREEYD VLDKRRGRDP EMGGKPRRKN PQEGLYNELQ KDKMAEAYSE  540
IGMKGERRRG KGHDGLYQGL STATKDTYDA LHMQALPPR                        579

SEQ ID NO: 31            moltype = AA  length = 557
FEATURE                  Location/Qualifiers
source                   1..557
                         mol_type = protein
                         organism = Synthetic construct
SEQUENCE: 31
EVQLVESGGG LVQPGGSLRL SCAASGFDFS RYWMSWVRQA PGKGLEWIGE INPDSSTINY   60
APSLKDKFII SRDNAKNSLY LQMNSLRAED TAVYYCARPD GNYWYFDVWG QGTLVTVSSG  120
STSGGGSGGG SGGGGSSDIQ MTQSPSSLSA SVGDRVTITC KASQDVGIAV AWYQQKPGKV  180
PKLLIYWAST RHTGVPDRFS GSGSGTDFTL TISSLQPEDV ATYYCQQYSS YPYTFGQGTK  240
VEIKESKYGP PCPPCPGGGS SGGGSGGQPR EPQVYTLPPS QEEMTKNQVS LTCLVKGFYP  300
SDIAVEWESN GQPENNYKTT PPVLDSDGSF FLYSRLTVDK SRWQEGNVFS CSVMHEALHN  360
HYTQKSLSLS LGKMFWVLVV VGGVLACYSL LVTVAFIIFW VRSKRSRGGH SDYMNMTPRR  420
PGPTRKHYQP YAPPRDFAAY RSGGGRVKFS RSADAPAYQQ GQNQLYNELN LGRREEYDVL  480
DKRRGRDPEM GGKPRRKNPQ EGLYNELQKD KMAEAYSEIG MKGERRRGKG HDGLYQGLST  540
ATKDTYDALH MQALPPR                                                557

SEQ ID NO: 32            moltype = AA  length = 955
FEATURE                  Location/Qualifiers
source                   1..955
                         mol_type = protein
                         organism = Synthetic construct
SEQUENCE: 32
MLLLVTSLLL CELPHPAFLL IPEVQLVESG GGLVQPGGSL RLSCAASGFD FSRYWMSWVR   60
QAPGKGLEWI GEINPDSSTI NYAPSLKDKF IISRDNAKNS LYLQMNSLRA EDTAVYYCAR  120
```

```
PDGNYWYFDV WGQGTLVTVS SGSTSGGGSG GGSGGGGSSD IQMTQSPSSL SASVGDRVTI    180
TCKASQDVGI AVAWYQQKPG KVPKLLIYWA STRHTGVPDR FSGSGSGTDF TLTISSLQPE    240
DVATYYCQQY SSYPYTFGQG TKVEIKESKY GPPCPPCPGG GSSGGGSGGQ PREPQVYTLP    300
PSQEEMTKNQ VSLTCLVKGF YPSDIAVEWE SNGQPENNYK TTPPVLDSDG SFFLYSRLTV    360
DKSRWQEGNV FSCSVMHEAL HNHYTQKSLS LSLGKMALIV LGGVAGLLLF IGLGIFFKRG    420
RKKLLYIFKQ PFMRPVQTTQ EEDGCSCRFP EEEEGGCELG GGRVKFSRSA DAPAYQQGQN    480
QLYNELNLGR REEYDVLDKR RGRDPEMGGK PRRKNPQEGL YNELQKDKMA EAYSEIGMKG    540
ERRRGKGHDG LYQGLSTATK DTYDALHMQA LPPRLEGGGE GRGSLLTCGD VEENPGPRML    600
LLVTSLLLCE LPHPAFLLIP RKVCNGIGIG EFKDSLSINA TNIKHFKNCT SISGDLHILP    660
VAFRGDSFTH TPPLDPQELD ILKTVKEITG FLLIQAWPEN RTDLHAFENL EIIRGRTKQH    720
GQFSLAVVSL NITSLGLRSL KEISDGDVII SGNKNLCYAN TINWKKLFGT SGQKTKIISN    780
RGENSCKATG QVCHALCSPE GCWGPEPRDC VSCRNVSRGR ECVDKCNLLE GEPREFVENS    840
ECIQCHPECL PQAMNITCTG RGPDNCIQCA HYIDGPHCVK TCPAGVMGEN NTLVWKYADA    900
GHVCHLCHPN CTYGCTGPGL EGCPTNGPKI PSIATGMVGA LLLLLVVALG IGLFM         955

SEQ ID NO: 33         moltype = AA  length = 574
FEATURE               Location/Qualifiers
source                1..574
                      mol_type = protein
                      organism = Synthetic construct
SEQUENCE: 33
MLLLVTSLLL CELPHPAFLL IPEVQLVESG GGLVQPGGSL RLSCAASGFD FSRYWMSWVR     60
QAPGKGLEWI GEINPDSSTI NYAPSLKDKF IISRDNAKNS LYLQMNSLRA EDTAVYYCAR    120
PDGNYWYFDV WGQGTLVTVS SGSTSGGGSG GGSGGGGSSD IQMTQSPSSL SASVGDRVTI    180
TCKASQDVGI AVAWYQQKPG KVPKLLIYWA STRHTGVPDR FSGSGSGTDF TLTISSLQPE    240
DVATYYCQQY SSYPYTFGQG TKVEIKESKY GPPCPPCPGG GSSGGGSGGQ PREPQVYTLP    300
PSQEEMTKNQ VSLTCLVKGF YPSDIAVEWE SNGQPENNYK TTPPVLDSDG SFFLYSRLTV    360
DKSRWQEGNV FSCSVMHEAL HNHYTQKSLS LSLGKMALIV LGGVAGLLLF IGLGIFFKRG    420
RKKLLYIFKQ PFMRPVQTTQ EEDGCSCRFP EEEEGGCELG GGRVKFSRSA DAPAYQQGQN    480
QLYNELNLGR REEYDVLDKR RGRDPEMGGK PRRKNPQEGL YNELQKDKMA EAYSEIGMKG    540
ERRRGKGHDG LYQGLSTATK DTYDALHMQA LPPR                                574

SEQ ID NO: 34         moltype = AA  length = 552
FEATURE               Location/Qualifiers
source                1..552
                      mol_type = protein
                      organism = Synthetic construct
SEQUENCE: 34
EVQLVESGGG LVQPGGSLRL SCAASGFDFS RYWMSWVRQA PGKGLEWIGE INPDSSTINY     60
APSLKDKFII SRDNAKNSLY LQMNSLRAED TAVYYCARPD GNYWYFDVWG QGTLVTVSSG    120
STSGGGSGGG SGGGGSSDIQ MTQSPSSLSA SVGDRVTITC KASQDVGIAV AWYQQKPGKV    180
PKLLIYWAST RHTGVPDRFS GSGSGTDFTL TISSLQPEDV ATYYCQQYSS YPYTFGQGTK    240
VEIKESKYGP PCPPCPGGGS SGGGSGGQPR EPQVYTLPPS QEEMTKNQVS LTCLVKGFYP    300
SDIAVEWESN GQPENNYKTT PPVLDSDGSF FLYSRLTVDK SRWQEGNVFS CSVMHEALHN    360
HYTQKSLSLS LGKMALIVLG GVAGLLLFIG LGIFFKRGRK KLLYIFKQPF MRPVQTTQEE    420
DGCSCRFPEE EEGGCELGGG RVKFSRSADA PAYQQGQNQL YNELNLGRRE EYDVLDKRRG    480
RDPEMGGKPR RKNPQEGLYN ELQKDKMAEA YSEIGMKGER RRGKGHDGLY QGLSTATKDT    540
YDALHMQALP PR                                                       552

SEQ ID NO: 35         moltype = AA  length = 1055
FEATURE               Location/Qualifiers
source                1..1055
                      mol_type = protein
                      organism = Synthetic construct
SEQUENCE: 35
MLLLVTSLLL CELPHPAFLL IPEVQLVESG GGLVQPGGSL RLSCAASGFD FSRYWMSWVR     60
QAPGKGLEWI GEINPDSSTI NYAPSLKDKF IISRDNAKNS LYLQMNSLRA EDTAVYYCAR    120
PDGNYWYFDV WGQGTLVTVS SGSTSGGGSG GGSGGGGSSD IQMTQSPSSL SASVGDRVTI    180
TCKASQDVGI AVAWYQQKPG KVPKLLIYWA STRHTGVPDR FSGSGSGTDF TLTISSLQPE    240
DVATYYCQQY SSYPYTFGQG TKVEIKESKY GPPCPPCPAP EFEGGPSVFL FPPKPKDTLM    300
ISRTPEVTCV VVDVSQEDPE VQFNWYVDGV EVHNAKTKPR EEQFQSTYRV VSVLTVLHQD    360
WLNGKEYKCK VSNKGLPSSI EKTISKAKGQ PREPQVYTLP PSQEEMTKNQ VSLTCLVKGF    420
YPSDIAVEWE SNGQPENNYK TTPPVLDSDG SFFLYSRLTV DKSRWQEGNV FSCSVMHEAL    480
HNHYTQKSLS LSLGKMALIV LGGVAGLLLF IGLGIFFKRG RKKLLYIFKQ PFMRPVQTTQ    540
EEDGCSCRFP EEEEGGCELG GGRVKFSRSA DAPAYQQGQN QLYNELNLGR REEYDVLDKR    600
RGRDPEMGGK PRRKNPQEGL YNELQKDKMA EAYSEIGMKG ERRRGKGHDG LYQGLSTATK    660
DTYDALHMQA LPPRLEGGGE GRGSLLTCGD VEENPGPRML LLVTSLLLCE LPHPAFLLIP    720
RKVCNGIGIG EFKDSLSINA TNIKHFKNCT SISGDLHILP VAFRGDSFTH TPPLDPQELD    780
ILKTVKEITG FLLIQAWPEN RTDLHAFENL EIIRGRTKQH GQFSLAVVSL NITSLGLRSL    840
KEISDGDVII SGNKNLCYAN TINWKKLFGT SGQKTKIISN RGENSCKATG QVCHALCSPE    900
GCWGPEPRDC VSCRNVSRGR ECVDKCNLLE GEPREFVENS ECIQCHPECL PQAMNITCTG    960
RGPDNCIQCA HYIDGPHCVK TCPAGVMGEN NTLVWKYADA GHVCHLCHPN CTYGCTGPGL   1020
EGCPTNGPKI PSIATGMVGA LLLLLVVALG IGLFM                              1055

SEQ ID NO: 36         moltype = AA  length = 674
FEATURE               Location/Qualifiers
source                1..674
                      mol_type = protein
                      organism = Synthetic construct
```

```
SEQUENCE: 36
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKESKY GPPCPPCPAP EFEGGPSVFL FPPKPKDTLM   300
ISRTPEVTCV VVDVSQEDPE VQFNWYVDGV EVHNAKTKPR EEQFQSTYRV VSVLTVLHQD   360
WLNGKEYKCK VSNKGLPSSI EKTISKAKGQ PREPQVYTLP PSQEEMTKNQ VSLTCLVKGF   420
YPSDIAVEWE SNGQPENNYK TTPPVLDSDG SFFLYSRLTV DKSRWQEGNV FSCSVMHEAL   480
HNHYTQKSLS LSLGKMALIV LGGVAGLLLF IGLGIFFKRG RKKLLYIFKQ PFMRPVQTTQ   540
EEDGCSCRFP EEEEGGCELG GRVKFSRSA DAPAYQQGQN QLYNELNLGR REEYDVLDKR   600
RGRDPEMGGK PRRKNPQEGL YNELQKDKMA EAYSEIGMKG ERRRGKGHDG LYQGLSTATK   660
DTYDALHMQA LPPR                                                   674

SEQ ID NO: 37            moltype = AA   length = 652
FEATURE                  Location/Qualifiers
source                   1..652
                         mol_type = protein
                         organism = Synthetic construct
SEQUENCE: 37
EVQLVESGGG LVQPGGSLRL SCAASGFDFS RYWMSWVRQA PGKGLEWIGE INPDSSTINY    60
APSLKDKFII SRDNAKNSLY LQMNSLRAED TAVYYCARPD GNYWYFDVWG QGTLVTVSSG   120
STSGGGSGGG SGGGGSSDIQ MTQSPSSLSA SVGDRVTITC KASQDVGIAV AWYQQKPGKV   180
PKLLIYWAST RHTGVPDRFS GSGSGTDFTL TISSLQPEDV ATYYCQQYSS YPYTFGQGTK   240
VEIKESKYGP PCPPCPAPEF EGGPSVFLFP PKPKDTLMIS RTPEVTCVVV DVSQEDPEVQ   300
FNWYVDGVEV HNAKTKPREE QFQSTYRVVS VLTVLHQDWL NGKEYKCKVS NKGLPSSIEK   360
TISKAKGQPR EPQVYTLPPS QEEMTKNQVS LTCLVKGFYP SDIAVEWESN GQPENNYKTT   420
PPVLDSDGSF FLYSRLTVDK SRWQEGNVFS CSVMHEALHN HYTQKSLSLS LGKMALIVLG   480
GVAGLLLFIG LGIFFKRGRK KLLYIFKQPF MRPVQTTQEE DGCSCRFPEE EEGGCELGGG   540
RVKFSRSADA PAYQQGQNQL YNELNLGRRE EYDVLDKRRG RDPEMGGKPR RKNPQEGLYN   600
ELQKDKMAEA YSEIGMKGER RRGKGHDGLY QGLSTATKDT YDALHMQALP PR           652

SEQ ID NO: 38            moltype = AA   length = 1060
FEATURE                  Location/Qualifiers
source                   1..1060
                         mol_type = protein
                         organism = Synthetic construct
SEQUENCE: 38
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKESKY GPPCPPCPAP EFEGGPSVFL FPPKPKDTLM   300
ISRTPEVTCV VVDVSQEDPE VQFNWYVDGV EVHNAKTKPR EEQFQSTYRV VSVLTVLHQD   360
WLNGKEYKCK VSNKGLPSSI EKTISKAKGQ PREPQVYTLP PSQEEMTKNQ VSLTCLVKGF   420
YPSDIAVEWE SNGQPENNYK TTPPVLDSDG SFFLYSRLTV DKSRWQEGNV FSCSVMHEAL   480
HNHYTQKSLS LSLGKMFWVL VVVGGVLACY SLLVTVAFII FWVRSKRSRG GHSDYMNMTP   540
RRPGPTRKHY QPYAPPRDFA AYRSGGGRVK FSRSADAPAY QQGQNQLYNE LNLGRREEYD   600
VLDKRRGRDP EMGGKPRRKN PQEGLYNELQ KDKMAEAYSE IGMKGERRRG KGHDGLYQGL   660
STATKDTYDA LHMQALPPRL EGGGEGRGSL LTCGDVEENP GPRMLLLVTS LLLCELPHPA   720
FLLIPRKVCN GIGIGEFKDS LSINATNIKH FKNCTSISGD LHILPVAFRG DSFTHTPPLD   780
PQELDILKTV KEITGFLLIQ AWPENRTDLH AFENLEIIRG RTKQHGQFSL AVVSLNITSL   840
GLRSLKEISD GDVIISGNKN LCYANTINWK KLFGTSGQKT KIISNRGENS CKATGQVCHA   900
LCSPEGCWGP EPRDCVSCRN VSRGECVDKC NLLEGEPREF VENSECIQC HPECLPQAMN   960
ITCTGRGPDN CIQCAHYIDG PHCVKTCPAG VMGENNTLVW KYADAGHVCH LCHPNCTYGC  1020
TGPGLEGCPT NGPKIPSIAT GMVGALLLLL VVALGIGLFM                       1060

SEQ ID NO: 39            moltype = AA   length = 679
FEATURE                  Location/Qualifiers
source                   1..679
                         mol_type = protein
                         organism = Synthetic construct
SEQUENCE: 39
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKESKY GPPCPPCPAP EFEGGPSVFL FPPKPKDTLM   300
ISRTPEVTCV VVDVSQEDPE VQFNWYVDGV EVHNAKTKPR EEQFQSTYRV VSVLTVLHQD   360
WLNGKEYKCK VSNKGLPSSI EKTISKAKGQ PREPQVYTLP PSQEEMTKNQ VSLTCLVKGF   420
YPSDIAVEWE SNGQPENNYK TTPPVLDSDG SFFLYSRLTV DKSRWQEGNV FSCSVMHEAL   480
HNHYTQKSLS LSLGKMFWVL VVVGGVLACY SLLVTVAFII FWVRSKRSRG GHSDYMNMTP   540
RRPGPTRKHY QPYAPPRDFA AYRSGGGRVK FSRSADAPAY QQGQNQLYNE LNLGRREEYD   600
VLDKRRGRDP EMGGKPRRKN PQEGLYNELQ KDKMAEAYSE IGMKGERRRG KGHDGLYQGL   660
STATKDTYDA LHMQALPPR                                              679

SEQ ID NO: 40            moltype = AA   length = 657
FEATURE                  Location/Qualifiers
source                   1..657
```

```
                        mol_type = protein
                        organism = Synthetic construct
SEQUENCE: 40
EVQLVESGGG LVQPGGSLRL SCAASGFDFS RYWMSWVRQA PGKGLEWIGE INPDSSTINY    60
APSLKDKFII SRDNAKNSLY LQMNSLRAED TAVYYCARPD GNYWYFDVWG QGTLVTVSSG   120
STSGGGSGGG SGGGGSSDIQ MTQSPSSLSA SVGDRVTITC KASQDVGIAV AWYQQKPGKV   180
PKLLIYWAST RHTGVPDRFS GSGSGTDFTL TISSLQPEDV ATYYCQQYSS YPYTFGQGTK   240
VEIKESKYGP PCPPCPAPEF EGGPSVFLFP PKPKDTLMIS RTPEVTCVVV DVSQEDPEVQ   300
FNWYVDGVEV HNAKTKPREE QFQSTYRVVS VLTVLHQDWL NGKEYKCKVS NKGLPSSIEK   360
TISKAKGQPR EPQVYTLPPS QEEMTKNQVS LTCLVKGFYP SDIAVEWESN GQPENNYKTT   420
PPVLDSDGSF FLYSRLTVDK SRWQEGNVFS CSVMHEALHN HYTQKSLSLS LGKMFWVLVV   480
VGGVLACYSL LVTVAFIIFW VRSKRSRGGH SDYMNMTPRR PGPTRKHYQP YAPPRDFAAY   540
RSGGGRVKFS RSADAPAYQQ GQNQLYNELN LGRREEYDVL DKRRGRDPEM GGKPRRKNPQ   600
EGLYNELQKD KMAEAYSEIG MKGERRRGKG HDGLYQGLST ATKDTYDALH MQALPPR      657

SEQ ID NO: 41           moltype = AA  length = 836
FEATURE                 Location/Qualifiers
source                  1..836
                        mol_type = protein
                        organism = Synthetic construct
SEQUENCE: 41
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKGGGS SGGGSGMALI VLGGVAGLLL FIGLGIFFKR   300
GRKKLLYIFK QPFMRPVQTT QEEDGCSCRF PEEEEGGCEL GGGRVKFSRS ADAPAYQQGQ   360
NQLYNELNLG RREEYDVLDK RRGRDPEMGG KPRRKNPQEG LYNELQKDKM AEAYSEIGMK   420
GERRRGKGHD GLYQGLSTAT KDTYDALHMQ ALPPRLEGGG EGRGSLLTCG DVEENPGPRM   480
LLLLVTSLLL ELPHPAFLLI PRKVCNGIGI GEFKDSLSIN ATNIKHFKNC TSISGDLHIL   540
PVAFRGDSFT HTPPLDPQEL DILKTVKEIT GFLLIQAWPE NRTDLHAFEN LEIIRGRTKQ   600
HGQFSLAVVS LNITSLGLRS LKEISDGDVI ISGNKNLCYA NTINWKKLFG TSGQKTKIIS   660
NRGENSCKAT GQVCHALCSP EGCWGPEPRD CVSCRNVSRG RECVDKCNLL EGEPREFVEN   720
SECIQCHPEC LPQAMNITCT GRGPDNCIQC AHYIDGPHCV KTCPAGVMGE NNTLVWKYAD   780
AGHVCHLCHP NCTYGCTGPG LEGCPTNGPK IPSIATGMVG ALLLLLVVAL GIGLFM       836

SEQ ID NO: 42           moltype = AA  length = 455
FEATURE                 Location/Qualifiers
source                  1..455
                        mol_type = protein
                        organism = Synthetic construct
SEQUENCE: 42
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKGGGS SGGGSGMALI VLGGVAGLLL FIGLGIFFKR   300
GRKKLLYIFK QPFMRPVQTT QEEDGCSCRF PEEEEGGCEL GGGRVKFSRS ADAPAYQQGQ   360
NQLYNELNLG RREEYDVLDK RRGRDPEMGG KPRRKNPQEG LYNELQKDKM AEAYSEIGMK   420
GERRRGKGHD GLYQGLSTAT KDTYDALHMQ ALPPR                              455

SEQ ID NO: 43           moltype = AA  length = 433
FEATURE                 Location/Qualifiers
source                  1..433
                        mol_type = protein
                        organism = Synthetic construct
SEQUENCE: 43
EVQLVESGGG LVQPGGSLRL SCAASGFDFS RYWMSWVRQA PGKGLEWIGE INPDSSTINY    60
APSLKDKFII SRDNAKNSLY LQMNSLRAED TAVYYCARPD GNYWYFDVWG QGTLVTVSSG   120
STSGGGSGGG SGGGGSSDIQ MTQSPSSLSA SVGDRVTITC KASQDVGIAV AWYQQKPGKV   180
PKLLIYWAST RHTGVPDRFS GSGSGTDFTL TISSLQPEDV ATYYCQQYSS YPYTFGQGTK   240
VEIKGGGSSG GGSGMALIVL GGVAGLLLFI GLGIFFKRGR KKLLYIFKQP FMRPVQTTQE   300
EDGCSCRFPE EEEGGCELGG GRVKFSRSAD APAYQQGQNQ LYNELNLGRR EEYDVLDKRR   360
GRDPEMGGKP RRKNPQEGLY NELQKDKMAE AYSEIGMKGE RRRGKGHDGL YQGLSTATKD   420
TYDALHMQAL PPR                                                     433

SEQ ID NO: 44           moltype = AA  length = 841
FEATURE                 Location/Qualifiers
source                  1..841
                        mol_type = protein
                        organism = Synthetic construct
SEQUENCE: 44
MLLLVTSLLL CELPHPAFLL IPEVQLVESG GGLVQPGGSL RLSCAASGFD FSRYWMSWVR    60
QAPGKGLEWI GEINPDSSTI NYAPSLKDKF IISRDNAKNS LYLQMNSLRA EDTAVYYCAR   120
PDGNYWYFDV WGQGTLVTVS SGSTSGGGSG GGSGGGGSSD IQMTQSPSSL SASVGDRVTI   180
TCKASQDVGI AVAWYQQKPG KVPKLLIYWA STRHTGVPDR FSGSGSGTDF TLTISSLQPE   240
DVATYYCQQY SSYPYTFGQG TKVEIKGGGS SGGGSGMFWV LVVVGGVLAC YSLLVTVAFI   300
IFWVRSKRSR GGHSDYMNMT PRRPGPTRKH YQPYAPPRDF AAYRSGGGRV KFSRSADAPA   360
YQQGQNQLYN ELNLGRREEY DVLDKRRGRD PEMGGKPRRK NPQEGLYNEL QKDKMAEAYS   420
```

```
EIGMKGERRR GKGHDGLYQG LSTATKDTYD ALHMQALPPR LEGGGEGRGS LLTCGDVEEN    480
PGPRMLLLVT SLLLCELPHP AFLLIPRKVC NGIGIGEFKD SLSINATNIK HFKNCTSISG    540
DLHILPVAFR GDSFTHTPPL DPQELDILKT VKEITGFLLI QAWPENRTDL HAFENLEIIR    600
GRTKQHGQFS LAVVSLNITS LGLRSLKEIS DGDVIISGNK NLCYANTINW KKLFGTSGQK    660
TKIISNRGEN SCKATGQVCH ALCSPEGCWG PEPRDCVSCR NVSRGRECVD KCNLLEGEPR    720
EFVENSECIQ CHPECLPQAM NITCTGRGPD NCIQCAHYID GPHCVKTCPA GVMGENNTLV    780
WKYADAGHVC HLCHPNCTYG CTGPGLEGCP TNGPKIPSIA TGMVGALLLL LVVALGIGLF    840
M                                                                    841

SEQ ID NO: 45          moltype = AA  length = 460
FEATURE                Location/Qualifiers
source                 1..460
                       mol_type = protein
                       organism = Synthetic construct
SEQUENCE: 45
MLLLVTSLLL CELPHPAFLL IPEVQLVESG GGLVQPGGSL RLSCAASGFD FSRYWMSWVR     60
QAPGKGLEWI GEINPDSSTI NYAPSLKDKF IISRDNAKNS LYLQMNSLRA EDTAVYYCAR    120
PDGNYWYFDV WGQGTLVTVS SGSTSGGGSG GGSGGGGSSD IQMTQSPSSL SASVGDRVTI    180
TCKASQDVGI AVAWYQQKPG KVPKLLIYWA STRHTGVPDR FSGSGSGTDF TLTISSLQPE    240
DVATYYCQQY SSYPYTFGQG TKVEIKGGGS SGGGGSGMFW VLVVVGGVLAC YSLLVTVAFI    300
IFWVRSKRSR GGHSDYMNMT PRRPGPTRKH YQPYAPPRDF AAYRSGGGRV KFSRSADAPA    360
YQQGQNQLYN ELNLGRREEY DVLDKRRGRD PEMGGKPRRK NPQEGLYNEL QKDKMAEAYS    420
EIGMKGERRR GKGHDGLYQG LSTATKDTYD ALHMQALPPR                          460

SEQ ID NO: 46          moltype = AA  length = 438
FEATURE                Location/Qualifiers
source                 1..438
                       mol_type = protein
                       organism = Synthetic construct
SEQUENCE: 46
EVQLVESGGG LVQPGGSLRL SCAASGFDFS RYWMSWVRQA PGKGLEWIGE INPDSSTINY     60
APSLKDKFII SRDNAKNSLY LQMNSLRAED TAVYYCARPD GNYWYFDVWG QGTLVTVSSG    120
STSGGGSGGG SGGGGSSDIQ MTQSPSSLSA SVGDRVTITC KASQDVGIAV AWYQQKPGKV    180
PKLLIYWAST RHTGVPDRFS GSGSGTDFTL TISSLQPEDV ATYYCQQYSS YPYTFGQGTK    240
VEIKGGGSSG GGSGMFWVLV VVGGVLACYS LLVTVAFIIF WVRSKRSGGG HSDYMNMTPR    300
RPGPTRKHYQ PYAPPRDFAA YRSGGGRVKF SRSADAPAYQ QGQNQLYNEL NLGRREEYDV    360
LDKRRGRDPE MGGKPRRKNP QEGLYNELQK DKMAEAYSEI GMKGERRRGK GHDGLYQGLS    420
TATKDTYDAL HMQALPPR                                                  438

SEQ ID NO: 47          moltype = DNA  length = 9796
FEATURE                Location/Qualifiers
source                 1..9796
                       mol_type = other DNA
                       organism = Synthetic construct
SEQUENCE: 47
gttagaccag atctgagcct gggagctctc tggctaacta gggaacccac tgcttaagcc     60
tcaataaagc ttgccttgag tgcttcaagt agtgtgtgcc cgtctgttgt gtgactctgg    120
taactagaga tccctcagac ccttttagtc agtgtggaaa atctctagca gtggcgcccg    180
aacaggga ct tgaaagcgaa agggaaacca gaggagctct ctcgacgcag gactcggctt    240
gctgaagcgc gcacggcaag aggcgagggg cggcgactgg tgagtacgcc aaaaattttg    300
actagcggag gctagaagga gagagatggg tgcgagagcg tcagtattaa gcgggggaga    360
attagatcga tgggaaaaaa ttcggttaag gccagggggga aagaaaaaat ataaattaaa    420
acatatagta tgggcaagca gggagctaga acgattcgca gttaatcctg gcctgttaga    480
aacatcagaa ggctgtagac aaatactggg acagctacaa ccatcccttc agacaggatc    540
agaagaactt agatcattat ataatacagt gcaaccctc tattgtgtgc atcaaaggat    600
agagataaaa gacaccaagg aagctttaga caagatagag gaagagcaaa acaaaagtaa    660
gaaaaagca cagcaagcag cagctgacac aggacacagc aatcaggtca gccaaaatta    720
ccctatagtg cagaacatcc aggggcaaat ggtacatcag gccatatcac ctagaacttt    780
aaatgcatgg gtaaaagtag tagaagagaa ggctttcagc ccagaagtaa tacccatgtt    840
ttcagcatta tcagaaggag ccaccccaca agatttaaac accatgctaa acacagtggg    900
gggacatcaa gcagccatgc aaatgttaaa agagaccatc aatgaggaag ctgcaggcaa    960
agagaagagt ggtgcagaga gaaaaaagag cagtgggaat aggagctttg ttccttgggt    1020
tcttgggagc agcaggaagc actatgggcg cagcgtcaat gacgctgacg gtacaggcca    1080
gacaattatt gtctggtata gtgcagcagc agaacaattt gctgagggct attgaggcgc    1140
aacagcatct gttgcaactc acagtctggg gcatcaagca gctccaggca agaatcctgg    1200
ctgtggaaag atacctaaag gatcaacagc tcctgggat ttggggttgc tctggaaaac    1260
tcatttgcac cactgctgtg ccttggatct acaaatggca gtattcatcc acaatttaa    1320
aagaaaaggg gggattgggg ggtacagtgc aggggaaaga atagtagaca taatagcaac    1380
agacatacaa actaaagaat tacaaaaaca aattacaaaatt ttcgggttta    1440
ttacagggac agcagagatc cagtttgggg atcaattgca tgaagaatct gcttagggtt    1500
aggcgttttg cgctgcttcg cgaggatctg cgatcgctcc ggtgcccgtc agtgggcaga    1560
gcgcacatcg cccacagtcc ccgagaagtt ggggggaggg gtcggcaatt gaaccggtgc    1620
ctagagaagg tggcgcgggg taaactggga aagtgatgtc gtgtactggc tccgcctttt    1680
tcccgagggt ggggagaac cgtatataag tgcagtagtc gccgtgaacg ttctttttcg    1740
caacgggttt gccgccagaa cacagctgaa gcttcgaggg gctcgcatct ctccttcacg    1800
cgcccgcgc cctacctgag gccgccatcc acgccggttg agtcgcgttc tgccgcctcc    1860
cgcctgtggt gcctcctgaa ctgcgtccgc cgtctaggta gtttaaagc tcaggtcgag    1920
accgggcctt tgtccggcgc tcccttggag cctacctaga ctcagccggc tctccacgct    1980
ttgcctgacc ctgcttgctc aactctacgt cttttgtttg ttcttctgttc tgcgccgtta    2040
```

```
cagatccaag ctgtgaccgg cgcctacggc tagcgccgcc accatgctgc tgctcgtgac 2100
atctctgctg ctgtgcgagc tgccccaccc cgccttcctg ctgattcctg aggtgcagct 2160
ggtggaaagc ggcggaggac tggtgcagcc tggcggatct ctgagactga gctgtgccgc 2220
cagcggcttc gacttcagcc ggtactggat gagctgggtg cgccaggccc ctggcaaagg 2280
cctggaatgg atcggcgaga tcaaccccga cagcagcacc atcaactacg cccccagcct 2340
gaaggacaag ttcatcatca gccgggacaa cgccaagaac agcctgtacc tgcagatgaa 2400
ctccctgcgg gccgaggaca ccgccgtgta ctattgcgcc agacccgacg caactactg 2460
gtacttcgac gtgtggggcc agggcaccct cgtgacagtg tctagcgcag cacaagcgg 2520
aggcggatct ggcggaggat cagccggggg aggatccagc gatatccaga tgacccagag 2580
ccccagcagc ctgtctgcca gcgtgggcga cagagtgacc atcacatgca aggccagca 2640
ggacgtggga atcgccgtgg cctggtatca gcagaaaccc ggcaaggtgc ccaagctgct 2700
gatctactgg gccagcacca gacacaccgg cgtgcccgat agattttccg gcagcggctc 2760
cggcaccgac ttcaccctga caatcagctc cctgcagcct gaggacgtgg ccacctacta 2820
ctgccagcag tacagcagct acccctacac cttcggcagg gcaccaaggt ggaaatcaa 2880
agagtctaag tacggccctc cctgcccccc ttgtccaggc ggcggatctt ccggaggagg 2940
aagcggaggc cagcccagag aacctcaggt gtacacactg cccccagcc aggaagagat 3000
gaccaagaat caggtgtccc tgacatgcct cgtgaaggc ttctaccct ccgatatcgc 3060
cgtggaatgg gagagcaacg gccagcctga gaacaactac aagaccaccc cccctgtgct 3120
ggacagcgac ggctcattct tcctgtacag caggctgacc gtggacaaga gccggtggca 3180
ggaaggcaac gtgttcagct gctccgtgat gcacgaggcc ctgcacaacc actacaccca 3240
gaagtccctg agcctgtccc tgggcaagat gttctgggtg ctggtggtcg tgggcggcgt 3300
gctggcctgt tatagcctgc tcgtgaccgt ggccttcatc atcttttggg tcgcagcaa 3360
gcggagcaga ggcggccaca cgactacat gaacatgacc cccagacggc caggccccac 3420
ccggaaacac tatcagcctt acgccctcc cagagacttc gccgcttatc ggtccggcgg 3480
agggcgggtg aagttcagca gaagcgccga cgccctgcc taccagcagg gccagaatca 3540
gctgtacaac gagctgaacc tgggcagaag ggaagagtac gacgtcctgg ataagcggaa 3600
aggccgggac cctgagatgg gcggcaagcc tcggcgaag aaccccccag aaggcctgta 3660
taacgaactg cagaaagaca agatggccga ggcctacagc gagatcggca tgaagggcga 3720
gcggaggcgg ggcaagggcc acgacggcct gtatcagggc ctgtccaccg ccaccaagga 3780
tacctacgac gccctgcaca tgcaggccct gccccaagg ctcgagggcg gcggagaggg 3840
cagaggaagt cttctaacat gcggtgacgt ggaggagaat cccggcccta ggatgcttct 3900
cctggtgaca agccttctgc tctgtgagtt accacaccca gcattcctcc tgatcccacg 3960
caaagtgtgt aacggaatag gtattggtga atttaaagac tcactctcca taatgctac 4020
gaatattaaa cacttcaaaa actgcaccctc catcagtggc gatctcccca tcctgccggt 4080
ggcatttagg ggtgactcct tcacacatac tcctcctctg gatccacagg aactggataa 4140
tctgaaaacc gtaaggaaaa tcacagggtt tttgctgatt caggcttggc ctgaaaacag 4200
agacttttgg catttccttt agtgtcccaa aaacgactaa gtccgaaccg gacttttgtc 4260
gacggacctc catgcctttg agaacctaga aatcatacg ggcaggacca agcaactatg 4320
tcagttttct cttgcagtcg tcagcctgaa cataacatcc tttgggattac gctccctcaa 4380
ggagataagt gatggagatg tgataatttc aggaaacaaa aatttgtgct atgcaaatac 4440
aataaactgg aaaaaactgt ttgggaccctc cggtcagaaa accaaaatta taagcaacag 4500
aggtgaaaac agctgcaagg ccacaggcca ggtctgccat gccttgtgct cccccgaggg 4560
ctgctgggc ccggagccca gggactgcgt ctcttgccga aatgtcagcc gaggcaggga 4620
atgcgtggac aagtgcaacc ttctggaggg tgagccaagg gagtttgtgg agaactctga 4680
gtgcatacag tgccacccag agtgcctgcc tcaggccatg aacatcacct gcacaggacg 4740
gggaccagac aactgtatcc agtgtgccca ctacattgac ggcccccact gcgtcaagac 4800
ctgccgggca ggagtcatgg gagaaaacaa cacccgtgct tggaagtacg cagacgccgg 4860
ccatgtgtgc caacctgtgcc atccaaactg cacctacgga tgcactgggc caggtctga 4920
aggctgtcca acgaatgggc ctaagatccc gtccatcgcc actgggatgg tgggggccct 4980
cctcttgctg ctggtggtgg ccctggggat cggcctcttc atgtgagcgg ccgctctaga 5040
cccgggctca aggaattcga tatcaagctt atcgataatc aacctctgga ttacaaaatt 5100
tgtgaaagat tgactggtat tcttaactat gttgctcctt ttacgctatg tggatacgct 5160
gctttaatgc ctttgtatca tgctattgct tcccgtatgg ctttcatttt ctcctccttg 5220
tataaatcct ggttgctgtc tctttatgag gagttgtggc ccgttgtcag caacgtggc 5280
gtggtgtgca ctgtgtttgc tgacgcaacc cccactggtt ggggcattgc caccacctgt 5340
cagctccttt ccgggacttt cgctttcccc ctcccattg ccacggcgga actcatcgcc 5400
gcctgccttg cccgctgctg acagggggc cggctgttgg gcactgacaa ttccgtggtg 5460
ttgtcgggga atcatcgtc ctttccttgg ctgctcgcct gtgttgccac ctggattctg 5520
cgcgggacgt ccttctgcta cgtccccgcg gccctcaatc cagcggacct tccttcccgc 5580
ggcctgctgc cggctctgcg gcctcttccg cgtcttcgcc ttcgccctca gacgagtcgg 5640
atctcccttt gggccgcctc cccgcatcga taccgtcgac tagccgtacc tttaagacca 5700
atgacttaca aggcagctgt agatcttagc cacttttaa aagaaagggg gggactggaa 5760
gggctaattc actcccaaag aagacaagat ctgcttttg cctgtactgg gtctctctgg 5820
ttagaccaga tctgagcctg ggagctctct ggctaactag ggaacccact gcttaagcct 5880
caataaagct tgccttgagt gcttcaagta gtgtgtgccc gtctgttgtg tgactctggt 5940
aactagagat ccctcagacc cttttagtca gtgtggaaaa tctctagcag aattcgatat 6000
caagcttatc gataccgtcg acctcgaggg ggggcccggt acccaattcg ccctatagtg 6060
agtcgtatta caattcactg gccgtcgttt tacaacgtcg tgactgggaa aaccctggcg 6120
ttacccaact taatcgcctt gcagcacatc cccctttcgc cagctggcgt aatagcgaag 6180
aggcccgcac cgatcgccct tcccaacagt tgcgcagcct gaatggcgaa tggaaattgt 6240
aagcgttaat attttgttaa aattcgcgtt aaatttttgt taaatcagct catttttaa 6300
ccaataggcc gaaatcggca aaatcccta taaatcaaaa gaatagaccg agataggtt 6360
gagtgttgtt ccagtttgga acaagagtcc actattaaaa acgtggact ccaacgtcaa 6420
agggcgaaaa accgtctatc agggcgatgg cccactacgt gaaccatcac ctaatcaag 6480
ttttttgggg tcgaggtgcc gtaaagcact aaatcggaac cctaaaggga gcccccgatt 6540
tagagcttga cggggaaagc cggcgaacgt ggcgagaaag gaagggaaga agcgaaagg 6600
agcgggcgct agggcgctgg caagtgtagc ggtcacgctg cgcgtaacca ccacacccgc 6660
cgcgcttaat gcgccgctac agggcgcgtc aggtggcact tttcggggaa atgtgcgcgg 6720
aacccctatt tgtttatttt tctaaataca ttcaaatatg tatccgctca tgagacaata 6780
```

```
accctgataa atgcttcaat aatattgaaa aaggaagagt atgagtattc aacatttccg   6840
tgtcgccctt attcccttt ttgcggcatt ttgccttcct gttttgctc acccagaaac    6900
gctggtgaaa gtaaaagatg ctgaagatca gttgggtgca cgagtgggtt acatcgaact   6960
ggatctcaac agcggtaaga tccttgagag ttttcgcccc gaagaacgtt ttccaatgat   7020
gagcacttt aaagttctgc tatgtggcgc ggtattatcc cgtattgacg ccgggcaaga    7080
gcaactcggt cgccgcatac actattctca gaatgacttg gttgagtact caccagtcac   7140
agaaaagcat cttacggatg gcatgacagt aagagaatta tgcagtgctg ccataaccat   7200
gagtgataac actgcggcca acttacttct gacaacgatc ggaggaccga aggagctaac   7260
cgcttttttg cacaacatgg gggatcatgt aactcgcctt gatcgttggg aaccggagct   7320
gaatgaagcc ataccaaacg acgagcgtga caccacgatg cctgtagcaa tggcaacaac   7380
gttgcgcaaa ctattaactg gcgaactact tactctagct tcccggcaac aattaataga   7440
ctggatggag gcggataaag ttgcaggacc acttctgcgc tcggcccttc cggctggctg   7500
gtttattgct gataaatctg gagccggtga gcgtgggtct cgcggtatca ttgcagcact   7560
ggggccagat ggtaagccct cccgtatcgt agttatctac acgacgggga gtcaggcaac   7620
tatggatgaa cgaaatagac agatcgctga gataggtgcc tcactgatta agcattggta   7680
actgtcagac caagtttact catatatact ttagattgat ttaaaacttc attttaatt    7740
taaaggatc taggtgaaga tcctttttga taatctcatg accaaaatcc cttaacgtga    7800
gttttcgttc cactgagcgt cagaccccgt agaaaagatc aaaggatctt cttgagatcc   7860
tttttttctg cgcgtaatct gctgcttgca aacaaaaaaa ccaccgctac cagcggtggt   7920
ttgtttgccg gatcaagagc taccaactct ttttccgaag gtaactggct tcagcagagc   7980
gcagatacca aatactgttc ttctagtgta gccgtagtta ggccaccact tcaagaactc   8040
tgtagcaccg cctacatacc tcgctctgct aatcctgtta ccagtggctg ctgccagtgg   8100
cgataagtcg tgtcttaccg ggttggactc aagacgatag ttaccggata aggcgcagcg   8160
gtcgggctga acggggggtt cgtgcacaca gcccagcttg gagcgaacga cctacaccga   8220
actgagatac ctacagcgtg agctatgaga aagcgccacg cttcccgaag ggagaaaggc   8280
ggacaggtat ccggtaagcg gcagggtcgg aacaggagag cgcttccagg gggaaacgcc   8340
gggaaacgcc tggtatcttt atagtcctgt cgggtttcgc cacctctgac ttgagcgtcg   8400
atttttgtga tgctcgtcag gggggcggag cctatggaaa aacgccagca acgcggcctt   8460
tttacggttc ctggccttt gctggccttt tgctcacatg ttctttcctg cgttatcccc    8520
tgattctgtg gataaccgta ttaccgcctt tgagtgagct gataccgctc gccgcagccg   8580
aacgaccgag cgcagcgagt cagtgagcga ggaagcggaa gagcgcccaa tacgcaaacc   8640
gcctctcccc gcgcgttggc cgattcatta atgcagctgg cacgacaggt ttcccgactg   8700
gaaagcgggc agtgagcgca acgcaattaa tgtgagttag ctcactcatt aggcacccca   8760
ggctttacac tttatgcttc cggctcgtat gttgtgtgga attgtgagcg gataacaatt   8820
tcacacagga aacagctatg accatgatta cgccaagctc gaattaacc ctcactaaag    8880
ggaacaaaag ctggagctcc accgcggtgg cggcctcgag gtcgagatcc ggtcgaccag   8940
caaccatagt cccgccccta actccgccca tcccgccct aactccgccc agttccgccc    9000
attctccgcc ccatggctga ctaattttt ttatttatgc agaggccgag gccgcctcgg    9060
cctctgagct attccagaag tagtgaggag gctttttttgg aggctaggc ttttgcaaaa    9120
agcttcgacg gtatcgattg gctcatgtcc aacattaccg ccatgttgac attgattatt   9180
gactagttat taatagtaat caattacggg gtcattagtt catagcccat atatggagtt   9240
ccgcgttaca taacttacgg taaatggccc gcctggctga ccgcccaacg accccccgcc   9300
attgacgtca ataatgacgt atgttccat agtaacgcca ataggggactt tccattgacg   9360
tcaatgggtg gagtatttac ggtaaactgc ccacttggca gtacatcaag tgtatcatat   9420
gccaagtacg ccccctattg acgtcaatga cggtaaatgg cccgcctggc attatgccca   9480
gtacatgacc ttatgggact ttcctacttg gcagtacatc tacgtattag tcatcgctat   9540
taccatggtg atgcggtttt ggcagtacat caatgggcgt ggatagcggt ttgactcacg   9600
gggatttcca agtctccacc ccattgacgt caatgggagt ttgttttggc accaaaatca   9660
acgggacttt ccaaaatgtc gtaacaactc cgccccattg acgcaaatgg gcggtaggcg   9720
tgtacggaat tcggagtggc gagccctcag atcctgcata taagcagctg cttttttgcct   9780
gtactgggtc tctctg                                                   9796
```

CS1 TARGETED CHIMERIC ANTIGEN RECEPTOR-MODIFIED T CELLS

CROSS-REFERENCE TO RELATED APPLICATIONS

This application is a Continuation Application of U.S. application Ser. No. 16/992,361, filed on Aug. 13, 2020, now U.S. Pat. No. 11,730,797, which is a Continuation Application of U.S. application Ser. No. 15/533,153, filed Jun. 5, 2017, now U.S. Pat. No. 10,821,161, which is a 371 National Stage Application of PCT/US2015/064303, filed Dec. 7, 2015, which claims the benefit of U.S. Provisional Application No. 62/088,423, filed Dec. 5, 2014, entitled "USE OF CENTRAL MEMORY DERIVED-CS1 CHIMERIC ANTIGEN RECEPTOR-MODIFIED T CELLS TO TREAT MULTIPLE MYELOMA", the entire contents of each of which are incorporated herein by reference.

FEDERALLY SPONSORED RESEARCH OR DEVELOPMENT

This invention was made with government support under Grant Numbers P50 CA107399 and P01 CA030206, awarded by the National Institutes of Health. The government has certain rights in the invention.

SEQUENCE LISTING

This application contains a Sequence Listing that has been submitted electronically as an XML file named 40056-0006003_SL_ST26.xml. The XML file, created on Jul. 10, 2023, is 65,497 bytes in size. The material in the XML file is hereby incorporated by reference in its entirety.

BACKGROUND

Tumor-specific T cell based immunotherapies, including therapies employing engineered T cells, have been investigated for anti-tumor treatment. In some cases the T cells used in such therapies do not remain active in vivo for a long enough period. In some cases, the antitumor activity of the T cells is relatively low. Therefore, there is a need in the art for tumor-specific cancer therapies with longer term antitumor functioning.

Adoptive T cell therapy (ACT) utilizing chimeric antigen receptor (CAR) engineered T cells may provide a safe and effective way to reduce recurrence rates of various cancers, since CAR T cells can be engineered to specifically recognize antigenically-distinct tumor populations in an MHC-independent manner.

Multiple myeloma (MM) is a B cell malignancy characterized by clonal expansion of plasma cells. MM accounts for approximately 1 percent of all cancers and slightly more than 10 percent of hematologic malignancies in the United States. In the United States alone, approximately 20,000 new cases will be diagnosed this year and over 11,000 people will die from this disease. Current therapies for MM often induce remission, but nearly all patients eventually relapse and die.

CS1 is a cell surface glycoprotein of the signaling lymphocyte activation molecule (SLAM) receptor family that is highly and selectively expressed on normal plasma cells and MM cells, with lower expression on NK cells and little or no expression on normal tissues. Elotuzumabc (HuLuc63), a humanized CS1 monoclonal antibody given together with bortezomib in patients with relapsed MM produces ≥PR in 48% of patients. The high expression of CS1 on MM cells, coupled with its restriction to plasma cells in normal tissue, makes CS1 a reasonable target for CAR T cell therapy (Hsi et al. 2008 *Clin Cancer Res* 14:2775).

SUMMARY

Described herein are CARs which comprise an extracellular domain, a transmembrane domain and an intracellular signaling domain. The extracellular domain includes a CS1-specific scFv region or a variant thereof and, optionally, a spacer, comprising, for example, a portion of human Fc domain. The extracellular domain enables the CAR, when expressed on the surface of a T cell, to direct T cell activity to cells expressing CS1, a receptor expressed on the surface of MM. The transmembrane domain includes, for example, a CD4 transmembrane domain, a CD8 transmembrane domain, a CD28 transmembrane domain, or a CD3 transmembrane domain. The intracellular signaling domain includes the signaling domain from the zeta chain of the human CD3 complex (CD3ζ) and one or more costimulatory domains, for example, a 4-1BB costimulatory domain. The inclusion of a costimulatory domain, such as the 4-1BB (CD137) costimulatory domain in series with CD3ζ in the intracellular region enables the T cell to receive co-stimulatory signals. T cells, for example, patient-specific, autologous T cells can be engineered to express the CARs described herein, and the engineered cells can be expanded and used in ACT. Various T cell subsets, including both alpha beta T cells and gamma delta T cells, can be used. In addition, the CAR can be expressed in other immune cells such as NK cells. Where a patient is treated with an immune cell expressing a CAR described herein the cell can be an autologous T cell or an allogenic T cell. In some cases the cells used are a cell population that includes both CD4+ and CD8+ central memory T cells ($T_{CM}$), which are CD62L+, CCR7+, CD45RO+, and CD45RA−. The cell population can include other types of T cells as well.

The CS1 CAR described herein has certain beneficial characteristics, e.g., persistence and enhanced antitumor activity following adoptive transfer.

T cells expressing a CAR targeting CS1 can be useful in treatment of cancers such as MM, as well as other cancers that express CS1. Thus, this disclosure includes methods for treating CS1 expressing cancer using T cells expressing a CAR described herein.

Described herein is a nucleic acid molecule encoding a CAR comprising: a CS1 scFv (e.g., EVQLVESGGGLVQPGGSLRLSCAASGFDFSRYWMSWVRQAPGKGLEWIGEINP DSSTINYAPSLKDKFIISRDNAKNSLYLQMNSLRAEDTAVYYCARPDGNYWYFD VWGQGTLVTVSSGSTSGGGSGGGSGGGGSSDIQMTQSPSSLSASVGDRVTITCK ASQDVGIAVAWYQQKPGKVPKLLIYWASTRHTGVPDRFSGSGSGTDFTLTISSLQ PEDVATYYCQQYSSYPYTFGQGTKVEIK; SEQ ID NO:1) or a variant thereof having 1-5 (e.g., 1 or 2) amino acid modifications (e.g., substitutions); a transmembrane domain selected from: a CD4 transmembrane domain or variant thereof having 1-5 (e.g., 1 or 2) amino acid modifications (e.g., substitutions), a CD8 transmembrane domain or variant thereof having 1-5 (e.g., 1 or 2) amino acid modifications (e.g., substitutions), a CD28 transmembrane domain or a variant thereof having 1-5 (e.g., 1 or 2) amino acid modifications (e.g., substitutions), and a CD3ζ transmembrane domain or a variant thereof having 1-5 (e.g., 1 or 2) amino acid modifications (e.g., substitutions); a costimulatory domain (e.g., a CD28 co-stimulatory domain or a variant thereof having 1-5 (e.g., 1 or 2) amino acid modifications (e.g., substitutions); or a 4-1BB co-stimulatory domain or a variant thereof having 1-5 (e.g., 1 or 2) amino acid modifications (e.g., substitutions); or both a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions); and a CD3ζ signaling domain or a variant thereof having 1-5 (e.g., 1 or 2) amino acid modifications.

This disclosure also nucleic acid molecules that encode any of the CARs described herein (e.g., vectors that include a nucleic acid sequence encoding one of the CARs) and isolated T cells that express any of the CARs described herein.

Described herein is a nucleic acid molecule encoding a chimeric antigen receptor, wherein chimeric antigen receptor comprises: a CS1 scFv; a spacer region; a CD28 or CD4 transmembrane domain, a CD28 costimulatory domain or a 4-IBB costimulatory domain, an optional GlyGlyGly linker, and a CD3ζ signaling domain.

In one embodiment, the CS1 CAR consists of or comprises the amino acid sequence of any of SEQ ID NOs:31, 34, 37, 40, 43, and 46 (mature CAR lacking a signal sequence) or the CS1 CAR consists of or comprises the amino acid sequence of any of SEQ ID NOs:30, 33, 36, 39, 42, and 45 (immature CAR having a GMCSFRa signal sequence). The CAR and can be expressed in a form that includes a signal sequence, e.g., a human GM-CSF receptor alpha signal sequence (MLLLVTSLLLCELPHPAFLLIP; SEQ ID NO:26). The CAR can be expressed with additional sequences that are useful for monitoring expression, for example a T2A skip sequence and a truncated EGFRt. Thus, the CAR can comprise or consist of the amino acid sequence of any of SEQ ID Nos: 29-46 or can comprise or consist of an amino acid sequence that is at least 95%, 96%, 97%, 98% or 99% identical to any of SEQ ID Nos: 29-46. The CAR can comprise or consist of the amino acid sequence of any of SEQ ID Nos: 29-46 with up to 1, 2, 3, 4 or 5 amino acid changes (preferably conservative amino acid changes).

Also disclosed is a population of human T cells transduced by a vector comprising an expression cassette encoding a CS1 chimeric antigen receptor described herein (e.g., a CAR that comprises or consists of the amino acid sequence of any of SEQ ID Nos: 29-46 or an amino acid sequence that is at least 95%, 96%, 97%, 98% or 99% identical to any of SEQ ID Nos: 29-46 or the amino acid sequence of any of SEQ ID Nos: 29-46 with up to 1, 2, 3, 4 or 5 amino acid changes (preferably conservative amino acid changes).

In various embodiments: the population of human T cells are central memory T cells (Tcm), e.g., CD8+/CD4+ Tcm.

An "amino acid modification" refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

CS1 ScFv Domain

The CS1 ScFv domain can be any ScFv that binds CS1. In some cases the CS1 ScFv domain includes a sequence that is at least 90%, at least 95%, at least 98% identical to or identical to SEQ ID NO:1. In some cases the CS1 scFv has 1, 2, 3, 4 of 5 amino acid changes (preferably conservative) compared to SEQ ID NO:1. The ScFv can be a humanized ScFv.

Spacer Region

The CAR described herein can include a spacer region located between the CS1 targeting domain (i.e., a CS1 ScFv or variant thereof) and the transmembrane domain. A variety of different spacers can be used. Some of them include at least portion of a human Fc region, for example a hinge portion of a human Fc region or a CH3 domain or variants thereof. Table 1 below provides various spacers that can be used in the CARs described herein.

TABLE 1

Examples of Spacers

| Name | Length | Sequence |
|---|---|---|
| a3 | 3 aa | AAA |
| linker | 10 aa | GGGSSGGGSG (SEQ ID NO: 2) |
| IgG4 hinge (S→P) (S228P) | 12 aa | ESKYGPPCPPCP (SEQ ID NO: 3) |
| IgG4 hinge | 12 aa | ESKYGPPCPSCP (SEQ ID NO: 4) |
| IgG4 hinge (S228P) + linker | 22 aa | ESKYGPPCPPCPGGGSSGGGSG (SEQ ID NO: 5) |
| CD28 hinge | 39 aa | IEVMYPPPYLDNEKSNGTIIHVKGKH LCPSPLFPGPSKP (SEQ ID NO: 6) |
| CD8 hinge-48aa | 48 aa | AKPTTTPAPRPPTPAPTIASQPLSLR PEACRPAAGGAVHTRGLDFACD (SEQ ID NO: 7) |
| CD8 hinge-45aa | 45 aa | TTTPAPRPPTPAPTIASQPLSLRPEA CRPAAGGAVHTRGLDFACD (SEQ ID NO: 8) |
| IgG4 (HL-CH3) (includes S228P in hinge) | 129 aa | ESKYGPPCPPCPGGGSSGGGSGGQPR EPQVYTLPPSQEEMTKNQVSLTCLVK GFYPSDIAVEWESNGQPENNYKTTPP VLDSDGSFFLYSRLTVDKSRWQEGNV FSCSVMHEALHNHYTQKSLSLSLGK (SEQ ID NO: 9) |
| IgG4 (L235E, N297Q) | 229 aa | ESKYGPPCPSCPAPEFEGGPSVFLFP PKPKDTLMISRTPEVTCVVVDVSQED PEVQFNWYVDGVEVHQAKTKPREEQF QSTYRVVSVLTVLHQDWLNGKEYKCK VSNKGLPSSIEKTISKAKGQPREPQV YTLPPSQEEMTKNQVSLTCLVKGFYP |

TABLE 1-continued

Examples of Spacers

| Name | Length | Sequence |
|---|---|---|
| | | SDIAVEWESNGQPENNYKTTPPVLDS<br>DGSFFLYSRLTVDKSRWQEGNVFSCS<br>VMHEALHNHYTQKSLSLSLGK (SEQ<br>ID NO: 10) |
| IgG4<br>(S228P,<br>L235E,<br>N297Q) | 229 aa | ESKYGPPCPPCPAPEFEGGPSVFLFP<br>PKPKDTLMISRTPEVTCVVVDVSQED<br>VPEQFNWYVDGVEVHQAKTKPREEQF<br>QSTYRVVSVLTVLHQDWLNGKEYKCK<br>VSNKGLPSSIEKTISKAKGQPREPQV<br>YTLPPSQEEMTKNQVSLTCLVKGFYP<br>SDIAVEWESNGQPENNYKTTPPVLDS<br>DGSFFLYSRLTVDKSRWQEGNVFSCS<br>VMHEALHNHYTQKSLSLSLGK (SEQ<br>ID NO: 11) |
| IgG4(CH3) | 107 aa | GQPREPQVYTLPPSQEEMTKNQVSLT<br>CLVKGFYPSDIAVEWESNGQPENNYK<br>TTPPVLDSDGSFFLYSRLTVDKSRWQ<br>EGNVFSCSVMHEALHNHYTQKSLSLS<br>LGK (SEQ ID NO: 12) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one ore more amino acid modifications, for example, 1, 2, 3, 4 or 5 substitutions, e.g., substitutions that reduce off-target binding.

In certain embodiments the spacer is a hinge/linger derived from an IgG1, IgG2, IgG3, or IgG4 that includes one or more amino acid residues substituted with an amino acid residue different from that present in an unmodified hinge. The one or more substituted amino acid residues are selected from, but not limited to one or more amino acid residues at positions 220, 226, 228, 229, 230, 233, 234, 235, 234, 237, 238, 239, 243, 247, 267, 268, 280, 290, 292, 297, 298, 299, 300, 305, 309, 218, 326, 330, 331, 332, 333, 334, 336, 339, or a combination thereof.

In some embodiments, the modified hinge of the hinge/liker is derived from an IgG1, IgG2, IgG3, or IgG4 that includes, but is not limited to, one or more of the following amino acid residue substitutions: C220S, C226S, S228P, C229S, P230S, E233P, V234A, L234V, L234F, L234A, L235A, L235E, G236A, G237A, P238S, S239D, F243L, P247I, S267E, H268Q, S280H, K290S, K290E, K290N, R292P, N297A, N297Q, S298A, S298G, S298D, S298V, T299A, Y300L, V305I, V309L, E318A, K326A, K326W, K326E, L328F, A330L, A330S, A331S, P331S, I332E, E333A, E333S, E333S, K334A, A339D, A339Q, P396L, or a combination thereof.

In some embodiments, the modified hinge is derived from a human IgG4 hinge/CH2/CH3 region having the amino acid sequence of SEQ ID NO: 10 or 11 or an amino acid sequence that is at least 90%, at least 95%, at least 98% identical to SEQ ID NO:10 or 11.

In certain embodiments, the modified hinge is derived from IgG4 that includes one or more amino acid residues substituted with an amino acid residue different from that present in an unmodified hinge. The one or more substituted amino acid residues are selected from, but not limited to one or more amino acid residues at positions 220, 226, 228, 229, 230, 233, 234, 235, 234, 237, 238, 239, 243, 247, 267, 268, 280, 290, 292, 297, 298, 299, 300, 305, 309, 218, 326, 330, 331, 332, 333, 334, 336, 339, or a combination thereof.

In some embodiments, the modified hinge is derived from an IgG4 that includes, but is not limited to, one or more of the following amino acid residue substitutions: 220S, 226S, 228P, 229S, 230S, 233P, 234A, 234V, 234F, 234A, 235A, 235E, 236A, 237A, 238S, 239D, 243L, 247I, 267E, 268Q, 280H, 290S, 290E, 290N, 292P, 297A, 297Q, 298A, 298G, 298D, 298V, 299A, 300L, 305I, 309L, 318A, 326A, 326W, 326E, 328F, 330L, 330S, 331S, 331S, 332E, 333A, 333S, 333S, 334A, 339D, 339Q, 396L, or a combination thereof, wherein the amino acid in the unmodified hinge is substituted with the above identified amino acids at the indicated position. In one instance the sequence includes the following amino acid changes S228P, L235E and N297Q.

For amino acid positions in immunoglobulin discussed herein, numbering is according to the EU index or EU numbering scheme (Kabat et al. 1991 Sequences of Proteins of Immunological Interest, 5th Ed., United States Public Health Service, National Institutes of Health, Bethesda, hereby entirely incorporated by reference). The EU index or EU index as in Kabat or EU numbering scheme refers to the numbering of the EU antibody (Edelman et al. 1969 Proc Natl Acad Sci USA 63:78-85).

The hinge/linker region can also comprise a IgG4 hinge region having the sequence ESKYGPPCPSCP (SEQ ID NO:4) or ESKYGPPCPPCP (SEQ ID NO:3).

The hinge/linger region can also comprise the sequence ESKYGPPCPPCP (SEQ ID NO:3) followed by the linker sequence GGGSSGGGSG (SEQ ID NO:2) followed by IgG4 CH3 sequence GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO:12). Thus, the entire linker/spacer region can comprise the sequence: ESKYGPPCPPCPGGGSSGGGSGGQPREPQVYTLPPSQEEMTKNQVSLTCLVKGFY PSDIAVEWESNGQPENNYKTTPPVLDSDGSFFLYSRLTVDKSRWQEGNVFSCSV MiEALHNHYTQKSLSLSLGK (SEQ ID NO:11). In some cases the spacer has 1, 2, 3, 4, or 5 single amino acid changes (e.g., conservative changes) compared to SEQ ID NO:11. In some cases, the IgG4 Fc hinge/linker region that is mutated at two positions (L235E; N297Q) in a manner that reduces binding by Fc receptors (FcRs).

Transmembrane Region

A variety of transmembrane domains can be used in the. Table 2 includes examples of suitable transmembrane domains. Where a spacer region is present, the transmembrane domain is located carboxy terminal to the spacer region.

TABLE 2

Examples of Transmembrane Domains

| Name | Accession | Length | Sequence |
|---|---|---|---|
| CD3z | J04132.1 | 21 aa | LCYLLDGILFIYGVILTALFL<br>(SEQ ID NO: 13) |
| CD28 | NM_006139 | 27 aa | FWVLVVVGGVLACYSLLVTVA<br>FIIFWV (SEQ ID NO: 14) |
| CD28(M) | NM_006139 | 28 aa | MFWVLVVVGGVLACYSLLVTV<br>AFIIFWV (SEQ ID NO: 15) |

TABLE 2-continued

Examples of Transmembrane Domains

| Name | Accession | Length | Sequence |
|---|---|---|---|
| CD4 | M35160 | 22 aa | MALIVLGGVAGLLLFIGLGIF F (SEQ ID NO: 16) |
| CD8tm | NM_001768 | 21 aa | IYIWAPLAGTCGVLLLSLVIT (SEQ ID NO: 17) |
| CD8tm2 | NM_001768 | 23 aa | IYIWAPLAGTCGVLLLSLVIT LY (SEQ ID NO: 18) |
| CD8tm3 | NM_001768 | 24 aa | IYIWAPLAGTCGVLLLSLVIT LYC (SEQ ID NO: 19) |
| 41BB | NM_001561 | 27 aa | IISFFLALTSTALLFLLFFLT LRFSVV (SEQ ID NO: 20) |

Costimulatory Domain

The costimulatory domain can be any domain that is suitable for use with a CD3 signaling domain. In some cases the costimulatory domain is a CD28 costimulatory domain that includes a sequence that is at least 90%, at least 95%, at least 98% identical to or identical to: RSKRSRGGH-SDYMNMTPRRPGPTRKHYQPYAPPRDFAAYRS (SEQ ID NO:23; LL to GG amino acid change double underlined). In some cases the CD28 co-signaling domain has 1, 2, 3, 4 of 5 amino acid changes (preferably conservative and preferably not in the underlined GG sequence) compared to SEQ ID NO:23. In some cases the co-signaling domain is a 4-1BB co-signaling domain that includes a sequence that is at least 90%, at least 95%, at least 98% identical to or identical to: KRGRKKLLYIFKQPFMRPVQTTQ-EEDGCSCRFPEEEEGGCEL (SEQ ID NO:24). In some cases the 4-1BB co-signaling domain has 1, 2, 3, 4 of 5 amino acid changes (preferably conservative) compared to SEQ ID NO:24.

The costimulatory domain(s) are located between the transmembrane domain and the CD3ζ signaling domain. Table 3 includes examples of suitable costimulatory domains together with the sequence of the CD3ζ signaling domain.

TABLE 3

CD3ζ Domain and Examples of Costimulatory Domains

| Name | Accession | Length | Sequence |
|---|---|---|---|
| CD3ζ | J04132.1 | 113 aa | RVKFSRSADAPAYQQGQNQLYNEL NLGRREEYDVLDKRRGRDPEMGGK PRRKNPQEGLYNELQKDKMAEAYS EIGMKGERRRGKGHDGLYQGLSTA TKDTYDALHMQALPPR (SEQ ID NO: 21) |
| CD28 | NM_006139 | 42 aa | RSKRSRLLHSDYMNMTPRRPGPTR KHYQPYAPPRDFAAYRS (SEQ ID NO: 22) |
| CD28gg* | NM_006139 | 42 aa | RSKRSRGGHSDYMNMTPRRPGPTR QKHYPYAPPRDFAAYRS (SEQ ID NO: 23) |
| 41BB | NM_001561 | 42 aa | KRGRKKLLYIFKQPFMRPVQTTQE EDGCSCRFPEEEEGGCEL (SEQ ID NO: 24) |
| OX40 | | 42 aa | ALYLLRRDQRLPPDAHKPPGGGSF IRTPQEEQADAHSTLAKI (SEQ ID NO: 25) |

In various embodiments: the costimulatory domain is selected from the group consisting of: a costimulatory domain depicted in Table 3 or a variant thereof having 1-5 (e.g., 1 or 2) amino acid modifications, a CD28 costimulatory domain or a variant thereof having 1-5 (e.g., 1 or 2) amino acid modifications, a 4-1BB costimulatory domain or a variant thereof having 1-5 (e.g., 1 or 2) amino acid modifications and an OX40 costimulatory domain or a variant thereof having 1-5 (e.g., 1 or 2) amino acid modifications. In certain embodiments, a 4-1BB costimulatory domain or a variant thereof having 1-5 (e.g., 1 or 2) amino acid modifications in present. In some embodiments there are two costimulatory domains, for example a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions). In various embodiments the 1-5 (e.g., 1 or 2) amino acid modification are substitutions. The costimulatory domain is amino terminal to the CD3ζ signaling domain and in some cases a short linker consisting of 2-10, e.g., 3 amino acids (e.g., GGG) is positioned between the costimulatory domain and the CD3ζ signaling domain.

CD3ζ Signaling Domain

The CD3ζ Signaling domain can be any domain that is suitable for use with a CD3ζ signaling domain. In some cases the CD3ζ signaling domain includes a sequence that is at least 90%, at least 95%, at least 98% identical to or identical to: RVKFSRSADAPAYQQGQNQLYNELNLGR-REEYDVLDKRRGRDPEMGGKPRRK NPQEGLY-NELQKDKMAEAYSEIGMKGERRRGKGHDGLYQGL-STATKDTYDAL HMQALPPR (SEQ ID NO:21). In some cases the CD3ζ signaling has 1, 2, 3, 4 of 5 amino acid changes (preferably conservative) compared to SEQ ID NO:21.

Truncated EGFR

The CD3ζ signaling domain can be followed by a ribosomal skip sequence (e.g., LEGGGEGRGSLLTCGD-VEENPGPR; SEQ ID NO:27) and a truncated EGFR having a sequence that is at least 90%, at least 95%, at least 98% identical to or identical to: LVTSLLLCELPHPAFLLIP-RKVCNGIGIGEFKDSL SINATNIKHFKNCTSISGDL-HIL PVAFRGDSFTHTPPLDPQELDILKTVKEITGF-LLIQAWPENRTDLHAFENLEIIRGR TKQHGQFSLAV-VSLNITSLGLRSLKEISDGDVIISGNKNLCYANTIN-WKKLFGTSG QKTKIISNRGENSCKATGQVCHAL-CSPEGCWGPEPRDCVSCRNVSRGRECVDKC NLLE-GEPREFVENSECIQCHPECLPQAMNITCTGRGPDNCI-QCAHYIDGPHCVKT CPAGVMGENNTLVWKY-ADAGHVCHLLCHLPNCTYGCTGPGLEGCPTNGPKIP-SIA TGMVGALLLLLVVALGIGLFM (SEQ ID NO:28). In some cases the truncated EGFR has 1, 2, 3, 4 of 5 amino acid changes (preferably conservative) compared to SEQ ID NO:28.

CS1 CAR

The CS1 CAR can include a sequence that is at least 90%, at least 95%, at least 9800 identical to or identical to the amino acid sequence depicted in FIG. 2, FIG. 6, FIG. 7, FIG.

8. FIG. 9 or FIG. 10 (SEQ ID Nos: 29-46; either including or excluding the GMCSFRa signal sequence and either including or excluding the T2A ribosomal skip sequence and the truncated EGFRt).

Among the CAR targeting CS1 described herein are those summarized in Table 4 in which the spacer region, transmembrane domain and costimulatory domain(s) for each CAR are indicated.

TABLE 4

Examples of CAR Targeting CS1

| Name | SEQ ID NO* | FIG | Spacer | TM | Costimulatory Domain(s) |
|---|---|---|---|---|---|
| CS1scFv-IgG4(HL-CH3)-CD28tm-CD28gg-Zeta-T2A-EGFRt. | 29//30//31 | 2 | IgG4(HL-CH3) | CD28 | CD28GG |
| CS1scFv-IgG4(HL-CH3)-CD4tm-41BB-Zeta-T2A-EGFRt. | 32//33//34 | 6 | IgG4(HL-CH3) | CD4 | 4-1BB |
| CS1scFv-IgG4(L235E,N297Q)-CD4tm-41BB-Zeta-T2A-EGFRt. | 35//36//37 | 7 | IgG4(L235E, N297Q) | CD4 | 4-1BB |
| CS1scFv-IgG4(L235E, N297Q)-CD28tm-CD28gg-Zeta-T2A-EGFRt | 38//39//40 | 8 | IgG4(L235E, N297Q) | CD28 | CD28GG |
| CS1scFv-Linker-CD4tm-41BB-Zeta-T2A-EGFRt. | 41//42//43 | 9 | L | CD4 | 4-1BB |
| CS1scFv-Linker-CD28tm-CD28gg-Zeta-T2A-EGFRt | 44//45//46 | 10 | L | CD28 | CD28GG |

*SEQ ID NOs for: entire sequence depicted including GMCSFRa signal sequence, T2A and EGFRt//sequence including GMCSFRa signal sequence but excluding T2A and EGFRt//sequence for sequence excluding GMCSFRa signal sequence, T2A and EGFRt.

DESCRIPTION OF DRAWINGS

FIG. 2 depicts the amino acid sequence of a CS1 CAR that includes signal peptide, a ribosomal skip sequence and an EGFRt (SEQ ID NO:29).

FIG. 6 depicts the amino acid sequence of CS1scFv-IgG4 (HL-CH3)-CD4tm-41BB-Zeta-T2A-EGFRt (SEQ ID NO:32).

FIG. 7 depicts the amino acid sequence of CS1scFv-IgG4 (L235E,N297Q)-CD4tm-41BB-Zeta-T2A-EGFRt (SEQ ID NO:35).

FIG. 8 depicts the amino acid sequence of CS1scFv-IgG4 (L235E, N297Q)-CD28tm-CD28gg-Zeta-T2A-EGFRt (SEQ ID NO:38).

FIG. 9 depicts the amino acid sequence of CS1scFv-Linker-CD4tm-41BB-Zeta-T2A-EGFRt (SEQ ID NO:41).

FIG. 10 depicts the amino acid sequence of CS1scFv-Linker-CD28tm-CD28gg-Zeta-T2A-EGFRt (SEQ ID NO:44).

FIGS. 11A-11E are the complete nucleotide sequence of CS1scFv-IgG4(HL-CH3)-CD28gg-Zeta-T2A-EGFRt_epHIV7 (SEQ ID NO: 47).

6 (CH2 4IBB); FIG. 8 (EQ CD28); FIG. 7 (EQ 4IBB); FIG. 10 (L CD28) and FIG. 9 (L CD4 IBB).

DETAILED DESCRIPTION

Figure 1:
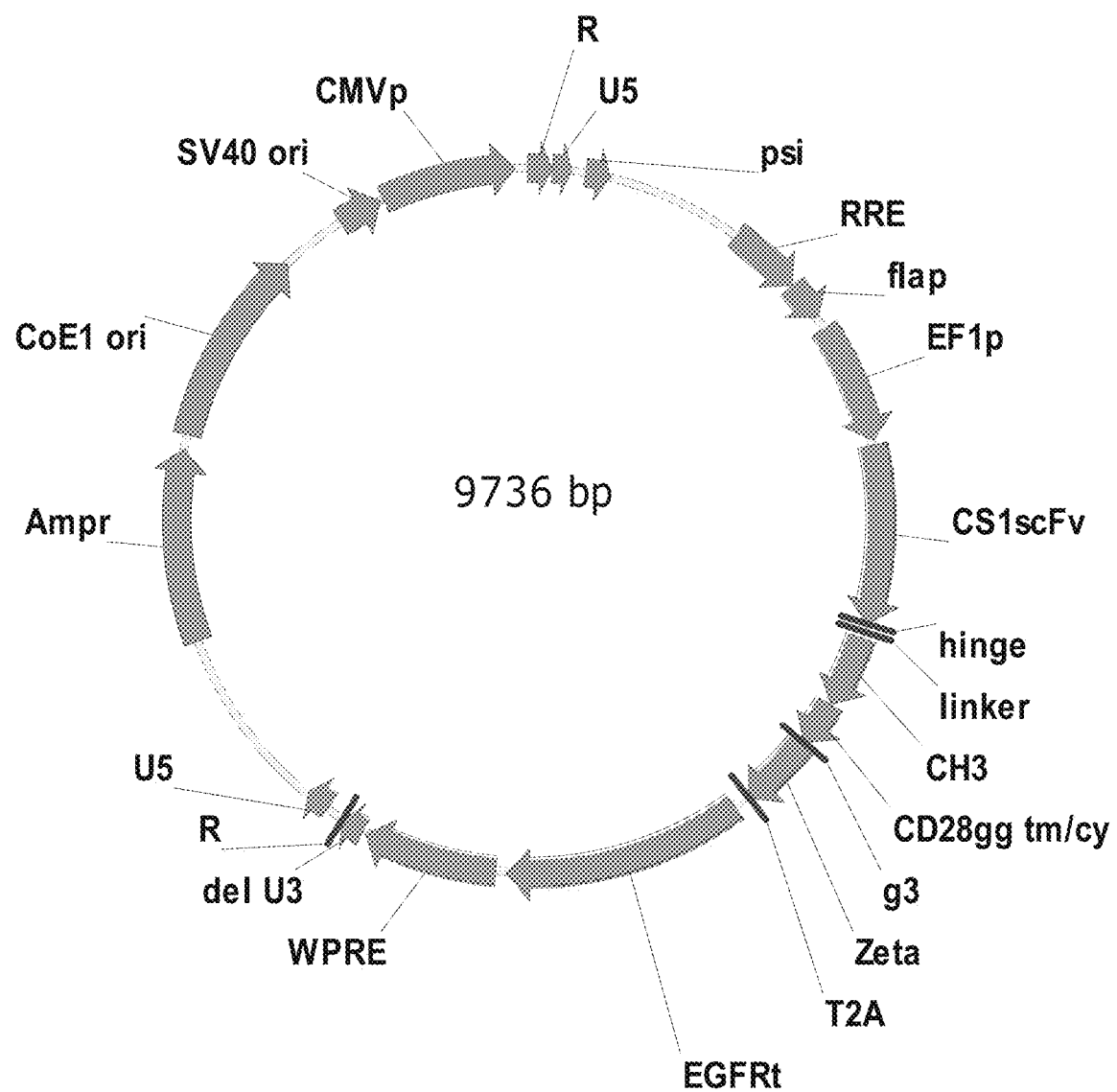
FIG. 1 is a schematic depiction of a CS1 CAR expressing lentiviral vector (CS1scFv-IgG4(HL-CH3)-CD28gg-Zeta (CO)-T2A-EGFRt_epHIV7). The CS1 CAR construct includes: a GMCSF signal sequence, CS1 scFv, IgG4 hinge region, linker, CH3 domain, a CD28 co-stimulatory domain and CD3ζ Signaling domain. The CAR construct is followed by a T2A ribosomal skip sequence, and then suicide gene EGFRt coding sequence. The CAR and EGFRt molecules are expressed from a single transcript.

Described below is the structure, construction and characterization of several CS1-specific chimeric antigen receptors ("CAR"). A CAR is a recombinant biomolecule that contains an extracellular recognition domain, a transmembrane region, and an intracellular signaling domain. The term "antigen," therefore, is not limited to molecules that bind antibodies, but to any molecule that can bind specifically to any receptor. "Antigen" thus refers to the recognition domain of the CAR. The extracellular recognition domain (also referred to as the extracellular domain or simply by the recognition element which it contains) comprises a recognition element that specifically binds to a molecule present on the cell surface of a target cell. The transmembrane region anchors the CAR in the membrane. The intracellular signaling domain comprises the signaling domain from the zeta chain of the human CD3 complex and optionally comprises one or more co-stimulatory signaling domains. CARs can both to bind antigen and transduce T cell activation, independent of MHC restriction. Thus, CARs are "universal" immunoreceptors which can treat a population of patients with antigen-positive tumors irrespective of their HLA genotype. Adoptive immunotherapy using T lymphocytes that express a tumor-specific CAR can be a powerful therapeutic strategy for the treatment of cancer.

In some cases, the CS1 CAR can be produced using a vector in which the CAR open reading frame is followed by a T2A ribosome skip sequence and a truncated EGFR (EGFRt), which lacks the cytoplasmic signaling tail. In this arrangement, co-expression of EGFRt provides an inert, non-immunogenic surface marker that allows for accurate measurement of gene modified cells, and enables positive selection of gene-modified cells, as well as efficient cell tracking of the therapeutic T cells in vivo following adoptive transfer. Efficiently controlling proliferation to avoid cytokine storm and off-target toxicity is an important hurdle for the success of T cell immunotherapy. The EGFRt incorporated in the CS1CAR lentiviral vector can act as suicide gene to ablate the CAR+ T cells in cases of treatment-related toxicity.

The CAR described herein can be produced by any means known in the art, though preferably it is produced using recombinant DNA techniques. Nucleic acids encoding the several regions of the chimeric receptor can be prepared and assembled into a complete coding sequence by standard techniques of molecular cloning known in the art (genomic library screening, overlapping PCR, primer-assisted ligation, site-directed mutagenesis, etc.) as is convenient. The resulting coding region is preferably inserted into an expression vector and used to transform a suitable expression host cell line, preferably a T lymphocyte cell line, and most preferably an autologous T lymphocyte cell line.

Various T cell subsets isolated from the patient can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immunomagnetically select cells expressing the desired receptors. The cells enriched for central memory T cells can be activated with anti-CD3/CD28, transduced with, for example, a lentiviral vector that directs the expression of an CS1 CAR as well as a non-immunogenic surface marker for in vivo detection, ablation, and potential ex vivo selection. The activated/genetically modified CS1 central memory T cells can be expanded in vitro with IL-2/IL-15 and then cryopreserved.

Example 1: Construction and Structure of epHIV7 Used for Expression of CS1-Specific CAR The pHIV7 plasmid is a parent plasmid from which the clinical vectors expressing a CS1 CAR can be derived. The epHIV7 vector used for expression of the CAR was produced from pHIV7 vector (Wang et al. 2011 Blood 118: 1255). Importantly, this vector uses the human EF1 promoter to drive expression of the CAR. Both the 5' and 3' sequences of the vector were derived from pv653RSN as previously derived from the HXBc2 provirus. The polypurine tract DNA flap sequences (cPPT) were derived from HIV-1 strain pNL4-3 from the NIH AIDS Reagent Repository.

Construction of pHIV7 was carried out as follows. Briefly, pv653RSN, containing 653 bp from gag-pol plus 5' and 3' long-terminal repeats (LTRs) with an intervening SL3-neomycin phosphotransferase gene (Neo), was subcloned into pBluescript, as follows: In Step 1, the sequences from 5' LTR to rev-responsive element (RRE) made p5'HIV-1 51, and then the 5' LTR was modified by removing sequences upstream of the TATA box, and ligated first to a CMV enhancer and then to the SV40 origin of replication (p5'HIV-2). In Step 2, after cloning the 3' LTR into pBluescript to make p3'HIV-1, a 400-bp deletion in the 3' LTR enhancer/promoter was made to remove cis-regulatory elements in HIV U3 and form p3'HIV-2. In Step 3, fragments isolated from the p5'HIV-3 and p3'HIV-2 were ligated to make pHIV-3. In Step 4, the p3'HIV-2 was further modified by removing extra upstream HIV sequences to generate p3'HIV-3 and a 600-bp BamHI-SalI fragment containing WPRE was added to p3'HIV-3 to make the p3'HIV-4. In Step 5, the pHIV-3 RRE was reduced in size by PCR and ligated to a 5' fragment from pHIV-3 (not shown) and to the p3'HIV-4, to make pHIV-6. In Step 6, a 190-bp BglII-BamHI fragment containing the cPPT DNA flap sequence from HIV-1 pNL4-3 (55) was amplified from pNL4-3 and placed between the RRE and the WPRE sequences in pHIV6 to make pHIV-7. This parent plasmid pHIV7-GFP (GFP, green fluorescent protein) was used to package the parent vector using a four-plasmid system.

A packaging signal, psi ψ, is required for efficient packaging of viral genome into the vector. The RRE and WPRE enhance the RNA transcript transport and expression of the transgene. The flap sequence, in combination with WPRE, has been demonstrated to enhance the transduction efficiency of lentiviral vector in mammalian cells.

The helper functions, required for production of the viral vector, are divided into three separate plasmids to reduce the probability of generation of replication competent lentivirus via recombination: 1) pCgp encodes the gag/pol protein required for viral vector assembly; 2) pCMV-Rev2 encodes the Rev protein, which acts on the RRE sequence to assist in the transportation of the viral genome for efficient packaging; and 3) pCMV-G encodes the glycoprotein of the vesiculo-stomatitis virus (VSV), which is required for infectivity of the viral vector.

There is minimal DNA sequence homology between the pHIV7 encoded vector genome and the helper plasmids. The regions of homology include a packaging signal region of approximately 600 nucleotides, located in the gag/pol sequence of the pCgp helper plasmid; a CMV promoter sequence in all three helper plasmids; and a RRE sequence in the helper plasmid pCgp. It is highly improbable that replication competent recombinant virus could be generated due to the homology in these regions, as it would require multiple recombination events. Additionally, any resulting recombinants would be missing the functional LTR and tat sequences required for lentiviral replication.

The CMV promoter was replaced by the EF1α-HTLV promoter (EF1p), and the new plasmid was named epHIV7. The EF1p has 563 bp and was introduced into epHIV7 using NruI and NheI, after the CMV promoter was excised.

The lentiviral genome, excluding gag/pol and rev that are necessary for the pathogenicity of the wild-type virus and are required for productive infection of target cells, has been removed from this system. In addition, epHIV7 vector construct does not contain an intact 3'LTR promoter, so the resulting expressed and reverse transcribed DNA proviral genome in targeted cells will have inactive LTRs. As a result of this design, no HIV-I derived sequences will be transcribed from the provirus and only the therapeutic sequences will be expressed from their respective promoters. The removal of the LTR promoter activity in the SIN vector is expected to significantly reduce the possibility of unintentional activation of host genes. Table 5 summarizes the various regulator elements present in epHIV7.

FIG. 1 is a schematic depiction of CS1 CAR (CS1scFv-IgG4(HL-CH3)-CD28gg-Zeta(CO)-T2A-EGFRt_epHIV7), a lentiviral vector containing the CAR construct composed of CS1 scFv, IgG4 hinge region, linker, a CD28 costimulatory domain and CD3ζ Signaling domain. The CAR construct is followed by a T2A ribosomal skip sequence, and then suicide gene EGFRt coding sequence. The CAR and EGFRt molecules are expressed from a single transcript. The entire nucleotide sequence of the vector is presented in FIGS. 11A-11E and Table 5 presents position of various elements of the vector.

TABLE 5

Functional elements of CS1 CAR_epHIV7

| Regulatory Elements and Genes | Location (Nucleotide Numbers) | Comments |
|---|---|---|
| U5 | 87-171 | 5' Unique sequence |
| psi | 233-345 | Packaging signal |
| RRE | 957-1289 | Rev-responsive element |
| flap | 1290-1466 | Contains polypurine track sequence and central termination sequence to facilitate nuclear import of pre-integration complex |
| EF1p Promoter | 1524-2067 | EF1-alpha Eukaryotic Promoter sequence driving expression of CD19Rop |
|  | 2084-4963 | Therapeutic insert |
| WPRE | 5011-5611 | Woodchuck hepatitis virus derived regulatory element to enhance viral RNA transportation |
| delU3 | 5626-5730 | 3' U3 with deletion to generate SIN vector |
| R | 5731-5811 | Repeat sequence within LTR |
| U5 | 5812-5925 | 3' U5 sequence in LTR |
| $Amp^R$ | 6761-7619 | Ampicillin-resistance gene |
| CoE1 ori | 7682-8563 | Replication origin of plasmid |
| SV40 ori | 8860-=9059 | Replication origin of SV40 |
| CMV promoter | 9073-9672 | CMV promoter to generate viral genome RNA |
| R | 9728-86 | Repeat sequence within LTR |

Example 2: Production of Vectors for Transduction of Patient T Cells

For each plasmid (CS1 CAR_epHIV7; pCgp; pCMV-G; and pCMV-Rev2), a seed bank is generated, which is used to inoculate the fermenter to produce sufficient quantities of plasmid DNA. The plasmid DNA is tested for identity, sterility and endotoxin prior to its use in producing lentiviral vector.

Briefly, cells are expanded from the 293T working cell (WCB), which has been tested to confirm sterility and the absence of viral contamination. A vial of 293T cells from the 293T WCB is thawed. Cells are grown and expanded until sufficient numbers of cells existed to plate an appropriate number of 10 layer cell factories (CFs) for vector production and cell train maintenance. A single train of cells can be used for production.

The lentiviral vector was produced in sub-batches of up to 10 CFs. Two subbatches can be produced in the same week leading to the production of approximately 20 L of lentiviral supernatant/week. The material produced from all sub-batches were pooled during the downstream processing phase, in order to produce one lot of product. 293T cells were plated in CFs in 293T medium (DMEM with 10% FBS). Factories were placed in a 37° C. incubator and horizontally leveled in order to get an even distribution of the cells on all the layers of the CF. Two days later, cells were transfected with the four lentiviral plasmids described above using the CaPO4 method, which involves a mixture of Tris:EDTA, 2M $CaCl_2$), 2×HBS, and the four DNA plasmids. Day 3 after transfection, the supernatant containing secreted lentiviral vectors was collected, purified and concentrated. After the supernatant was removed from the CFs, End-of-Production Cells were collected from each CF. Cells were trypsinized from each factory and collected by centrifugation. Cells were resuspended in freezing medium and cryopreserved. These cells were later used for replication-competent lentivirus (RCL) testing.

To purify and formulate vectors crude supernatant was clarified by membrane filtration to remove the cell debris. The host cell DNA and residual plasmid DNA were degraded by endonuclease digestion (Benzonase®). The viral supernatant was clarified of cellular debris using a 0.45 m filter. The clarified supernatant was collected into a pre-weighed container into which the Benzonase® is added (final concentration 50 U/mL). The endonuclease digestion for residual plasmid DNA and host genomic DNA as performed at 37° C. for 6 h. The initial tangential flow ultra-filtration (TFF) concentration of the endonuclease-treated supernatant was used to remove residual low molecular weight components from the crude supernatant, while concentrating the virus ~20 fold. The clarified endonuclease-treated viral supernatant was circulated through a hollow fiber cartridge with a NMWCO of 500 kD at a flow rate designed to maintain the shear rate at ~4,000 sec-1 or less, while maximizing the flux rate. Diafiltration of the nuclease-treated supernatant was initiated during the concentration process to sustain the cartridge performance. An 80% permeate replacement rate was established, using 4% lactose in PBS as the diafiltration buffer. The viral supernatant was brought to the target volume, representing a 20-fold concentration of the crude supernatant, and the diafiltration was continued for 4 additional exchange volumes, with the permeate replacement rate at 100%.

Further concentration of the viral product was accomplished by using a high speed centrifugation technique. Each sub-batch of the lentivirus was pelleted using a Sorvall RC-26 plus centrifuge at 6000 RPM (6,088 RCF) at 6° C. for 16-20 h. The viral pellet from each sub-batch was then reconstituted in a 50 mL volume with 4% lactose in PBS. The reconstituted pellet in this buffer represents the final formulation for the virus preparation. The entire vector concentration process resulted in a 200-fold volume reduction, approximately. Following the completion of all of the sub-batches, the material was then placed at −80° C., while samples from each sub-batch were tested for sterility. Following confirmation of sample sterility, the sub-batches were rapidly thawed at 37° C. with frequent agitation. The material was then pooled and manually aliquoted in the Class II Type A/B3 biosafety cabinet in the viral vector suite. A fill configuration of 1 mL of the concentrated lentivirus in sterile USP class 6, externally threaded O-ring cryovials was used. Center for Applied Technology Development (CATD)'s Quality Systems (QS) at COH released all materials according to the Policies and Standard Operating Procedures for the CBG and in compliance with current Good Manufacturing Practices (cGMPs).

To ensure the purity of the lentiviral vector preparation, it is tested for residual host DNA contaminants, and the transfer of residual host and plasmid DNA. Among other tests, vector identity is evaluated by RT-PCR to ensure that the correct vector is present. All release criteria are met for the vector intended for use in this study.

Example 3: Preparation of Tcm Cells Suitable for Use in ACT

T lymphocytes are obtained from a patient by leukopheresis, and the appropriate allogenic or autologous T cell subset, for example, Central Memory T cells (Tcm), are genetically altered to express the CAR, then administered back to the patient by any clinically acceptable means, to achieve anti-cancer therapy.

Tcm that are CD8+ are isolated essentially as described in Wang et al. (*J Immunology* 35:689, 2012). Briefly, on the day of leukopheresis, PBMC were isolated by density gradient centrifugation over Ficoll-Paque followed by two washes in PBS/EDTA. PBMC were then washed once in PBS, resuspended in X Vivo15 media containing 10% fetal calf serum (FCS), transferred to a 300 cc transfer bag, and stored on a 3-D rotator overnight at room temperature (RT). The following day, up to $5 \times 10^9$ PBMC were incubated in a 300 cc transfer bag with clinical grade anti-CD4 (2.5 mL), anti-CD14 (1.25 mL), and anti-CD45RA (2.5 mL) microbeads (Miltenyi Biotec) for 30 minutes at RT in X Vivo15 containing 10% FCS. CD4+, CD14+ and CD45RA+ cells were then immediately depleted using the CliniMACS™ depletion mode according to the manufacturer's instructions (Miltenyi Biotec). After centrifugation, the unlabeled negative fraction of cells was resuspended in CliniMACS™ PBS/EDTA buffer (Miltenyi Biotec) containing 0.5% human serum albumin (HSA) and then labeled with clinical grade biotinylated-DREG56 mAb (COHNMC CBG) at 0.1 mg/106 cells for 30 minutes at RT. The cells were then washed and resuspended in a final volume of 100 mL CliniMACS™ PBS/EDTA containing 0.5% HSA and transferred into a new 300 cc transfer bag. After 30 minutes incubation with 1.25 mL anti-biotin microbeads (Miltenyi Biotec), the CD62L+ fraction of PBMC (CD8+ TCM) was purified with positive selection on CliniMACS™ according to the manufacturer's instructions, and resuspended in X Vivo15 containing 10% FCS.

Tcm that are CD8+/CD4+ are prepared using a modification of the forgoing process by modifying the CD4+, CD14+ and CD45RA+ selection to a CD14+ and CD45RA+ selection. The method uses a two-step process on the CliniMACS™ device to first deplete CD14+ and CD45RA+ cells, then to positively select CD62L+ cells. This modified platform generates $50 \times 10^6$ bulk Tcm from a single leukapheresis.

Following enrichment, Tcm cells are formulated in complete X-Vivo15 plus 50 IU/mL IL-2 and 0.5 ng/mL IL-15 and transferred to a Teflon cell culture bag, where they are stimulated with Dynal ClinEx™ Vivo CD3/CD28 beads. Up to five days after stimulation, cells are transduced with lentiviral vector encoding CS1 CAR at a multiplicity of infection (MOI) of about 3. Cultures are maintained for up to 42 days with addition of complete X-Vivo15 and IL-2 and IL-15 cytokine as required for cell expansion (keeping cell density between $3 \times 10^5$ and $2 \times 10^6$ viable cells/mL, and cytokine supplementation every Monday, Wednesday and Friday of culture). Cells typically expand to approximately $10^9$ cells under these conditions within 21 days. At the end of the culture period cells are harvested, washed twice and formulated in clinical grade cryopreservation medium.

On the day(s) of T cell infusion, the cryopreserved and released product will be thawed, washed and formulated for re-infusion. The cryopreserved vials containing the released cell product will be removed from liquid nitrogen storage, thawed, cooled and washed with a PBS/2% human serum albumin (HSA) Wash Buffer. After centrifugation, the supernatant will be removed and the cells resuspended in a Preservative-Free Normal Saline (PFNS)/2% HSA infusion diluent. Samples will be removed for quality control testing.

Example 4: Amino acid Sequence of CS1 CAR (CS1scFv-IgG4(HL-CH3)-CD28tm-CD28gg-Zeta-T2A-EGFRt)

The complete amino acid sequence of CS1scFv-IgG4 (HL-CH3)-CD28tm-CD28gg-Zeta-T2A-EGFRt is depicted in FIG. 2. The entire sequence (SEQ ID NO:29) includes: a 22 amino acid GMCSF signal peptide (SEQ ID NO:26), a CS1 scFv sequence (SEQ ID NO:1); a IgG4 hinge sequence (SEQ ID NO:3; with amino acid substitutions S to P shaded); a 10 amino acid linker (SEQ ID NO:2); IgG4 CH3 sequence (SEQ ID NO:12); a 28 amino acid CD28 transmembrane domain sequence (SEQ ID NO:14); a CD28gg co-stimulatory domain sequence (SEQ ID NO:23; LL to GG amino acid changes highlighted); a 3 amino acid Gly linker; a 112 amino acid CD3ζ sequence (SEQ ID NO:21); a 24 amino acid T2A skip sequence (SEQ ID NO:27); and EGFRt sequence (SEQ ID NO:28).

Example 5: Activity of CS1 CAR

Figure 3:
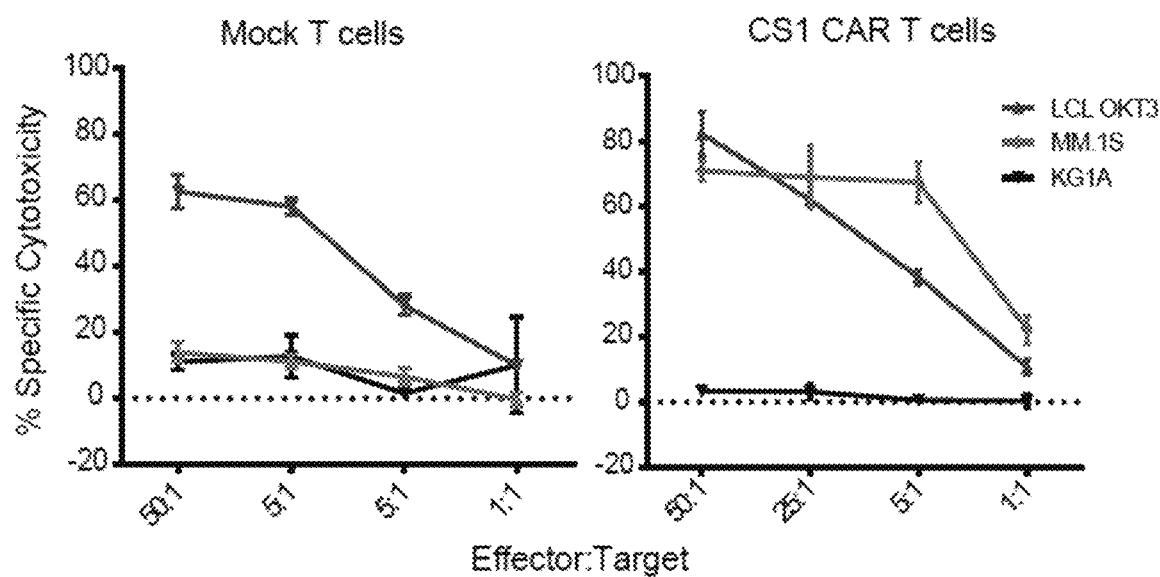
FIG. 3 is a pair of graphs depicting the results of studies showing that CS1 CAR re-directed Tcm exhibited cytotoxicity against MM cells. Cytotoxicity of the propagated CS1 CAR T cells was evaluated using 4-hour 51Cr release assays after co-culture with 51Cr-labeled target cells. OKT3 expressing LCLs were used as positive controls since they engage all TCRs, and CS1-negative AML cells (KG1a) were used as negative controls. CS1 CAR, but not un-engineered mock T cells showed specific cytotoxicity against MM cells.
Figure 4:
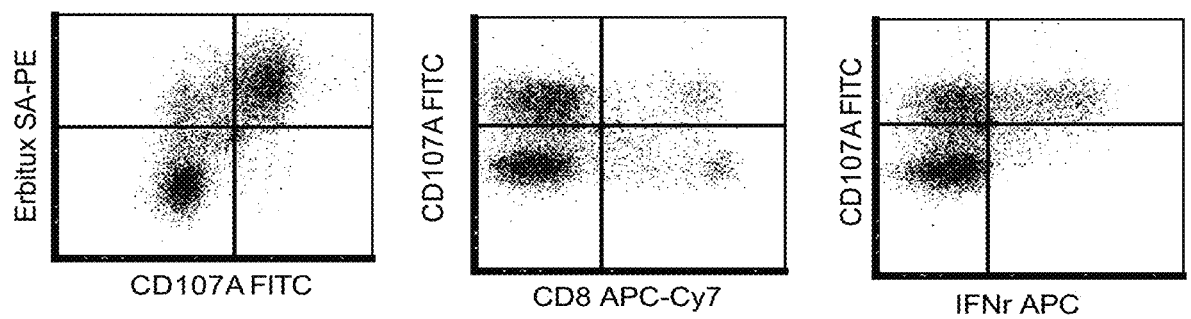
FIG. 4 depicts the results of studies showing that CS1 CAR re-directed Tcm cells exhibited effector function in response to stimulation of MM cells. CS1 CAR T cells ($10^5$) were co-cultured 6 hours in 96-well tissue culture plates with $10^5$ of MM.1 S cells as stimulators. 107a degranulation and intracellular IFNgamma production were analyzed with flow cytometry. The majority of the CAR T cells identified by Erbitux were induced to degranulate after engagement with MM cells and IFNgamma positive cells were detected in respond to antigen stimulation.
Figure 5:
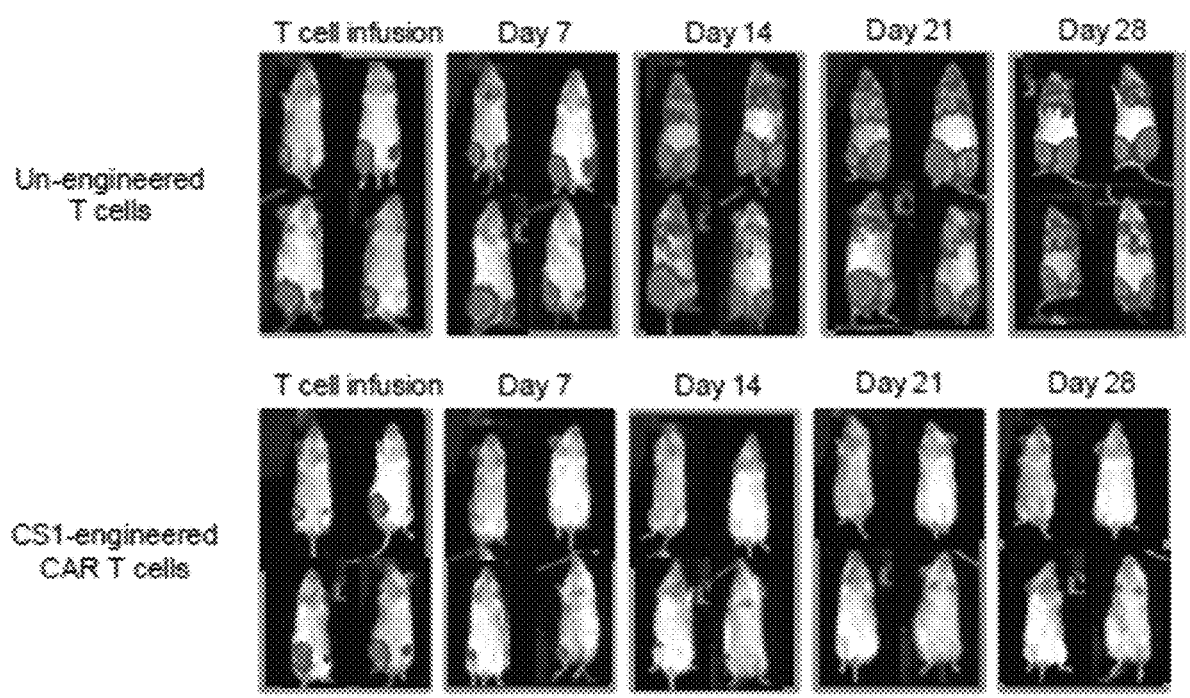
FIG. 5 depicts the results of studies showing that CS1 CAR re-directed Tcm cells eradicate multiple myeloma in vivo. Approximately $2 \times 10^6$ Firefly luciferase expressing MM.1S cells were inoculated into NSG mice via Intra-tibial injection. 7 days after tumor inoculation, $1 \times 10^6$ CS-1 CAR T cells were infused into the tumor bearing mice by intravenous injection. Tumor burdens were monitored with Xenogen® imaging once a week. Mice that received un-engineered cells were used as control. CS1 CAR T cells completely eradicated MM tumor 14 days post T cell infusion, while un-engineered T cells have no effects on tumor inhibition.

Cytotoxicity of the propagated CS1 CAR T cells expressing the CAR shown in FIG. 2 was evaluated using 4-hour 51Cr release assays after co-culture with 51Cr-labeled MM cells (MM.1S). As shown in FIG. 3, the engineered CS1 CAR T cells exhibit specific and efficient killing of MM cells, while un-transduced mock T cells has no cytocoxicity to MM cells. When co-cultured with MM cells, the engineered CS1 CAR Tcm-mediated strong effector function as indicated by 107a degranulation and IFNgamma as shown in FIG. 4. Upon adoptively transferred into MM tumor bearing NSG mice, the CS1 specific T cells exhibited efficient antitumor activity as shown in FIG. 5.

Figure 12:
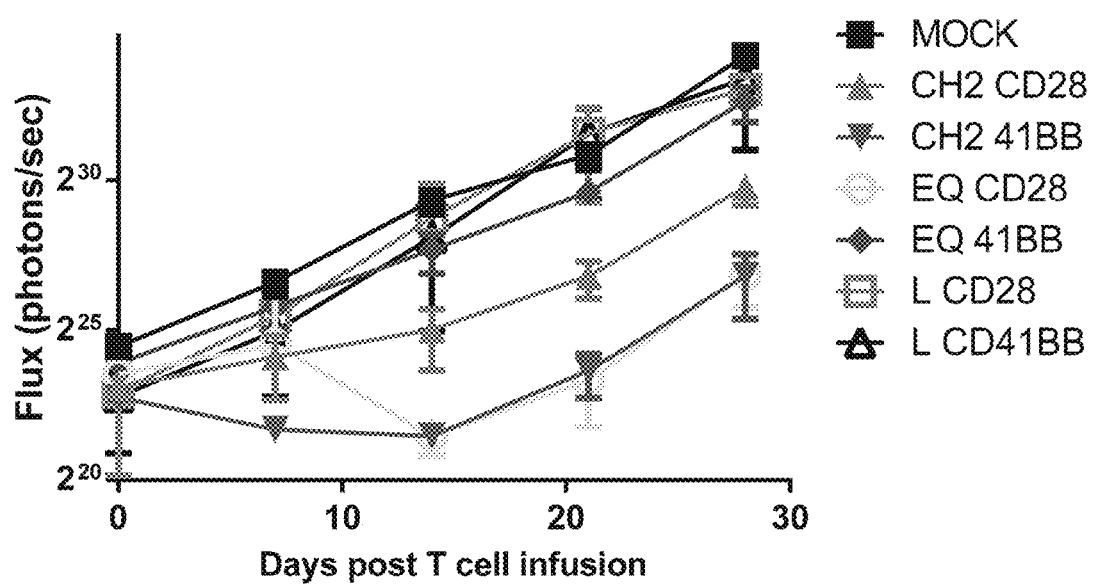
FIG. 12 depicts the results of studies showing that CS1 CAR re-directed Tcm cells eradicate multiple myeloma in vivo. 2×106 GFPffluc+MM.1S cells were inoculated via Intra-tibial injection into NSG mice on day −7. 1×106 central memory T cell (Tcm) derived CS1 CAR+ T cells were intravenously infused into the tumor bearing mice on day 0. Mice received no T cells or un-transduced Tcm from the same donor were used as negative controls. Tumor signals were monitored by biophotonic imaging. Means±SEM of phonton/sec from multiple mice are depicted. The CAR were those of FIG. 2 (CH2 CD28); FIG.

In another study with additional CS1 CAR (FIG. 2 and FIGS. 6-10) $2 \times 10^6$ GFPffluc+MM.1S cells were inoculated via Intra-tibial injection into NSG mice on day −7. $1 \times 10^6$ central memory T cell (Tcm) derived CS1 CAR+ T cells were intravenously infused into the tumor bearing mice on day 0. Mice received no T cells or un-transduced Tcm from the same donor were used as negative controls. Tumor signals were monitored by biophotonic imaging. Means±SEM of phonton/sec from multiple mice are depicted. The results of this analysis are shown in FIG. 12.

What is claimed is:

1. A nucleic acid molecule comprising a nucleotide sequence encoding a chimeric antigen receptor (CAR) targeting CS1, wherein the CAR comprises:
   (a) a CS1 scFv comprising the amino acid sequence of SEQ ID NO: 1; a spacer domain comprising the amino acid sequence of SEQ ID NO: 9; a transmembrane domain comprising the amino acid sequence of SEQ ID NO: 15; a co-signaling domain comprising the amino acid sequence of SEQ ID NO: 23; and a CD3ζ signaling domain comprising the amino acid sequence of SEQ ID NO: 21;
   (b) a CS1 scFv comprising the amino acid sequence of SEQ ID NO: 1; a spacer domain comprising the amino acid sequence of SEQ ID NO: 9; a transmembrane domain comprising the amino acid sequence of SEQ ID NO: 16; a co-signaling domain comprising the amino acid sequence of SEQ ID NO: 24; and a CD3ζ signaling domain comprising the amino acid sequence of SEQ ID NO: 21;
   (c) a CS1 scFv comprising the amino acid sequence of SEQ ID NO: 1; a spacer domain comprising the amino acid sequence of SEQ ID NO: 11; a transmembrane domain comprising the amino acid sequence of SEQ ID NO: 16; a co-signaling domain comprising the amino acid sequence of SEQ ID NO: 24; and a CD3ζ signaling domain comprising the amino acid sequence of SEQ ID NO: 21;
   (d) a CS1 scFv comprising the amino acid sequence of SEQ ID NO: 1; a spacer domain comprising the amino acid sequence of SEQ ID NO: 11; a transmembrane domain comprising the amino acid sequence of SEQ ID NO: 15; a co-signaling domain comprising the amino acid sequence of SEQ ID NO: 23; and a CD3ζ signaling domain comprising the amino acid sequence of SEQ ID NO: 21;
   (e) a CS1 scFv comprising the amino acid sequence of SEQ ID NO: 1; a spacer domain comprising the amino acid sequence of SEQ ID NO: 2; a transmembrane domain comprising the amino acid sequence of SEQ ID NO: 16; a co-signaling domain comprising the amino acid sequence of SEQ ID NO: 24; and a CD3ζ signaling domain comprising the amino acid sequence of SEQ ID NO: 21; or (f) a CS1 scFv comprising the amino acid sequence of SEQ ID NO: 1; a spacer domain comprising the amino acid sequence of SEQ ID NO: 2; a transmembrane domain comprising the amino acid sequence of SEQ ID NO: 15; a co-signaling domain comprising the amino acid sequence of SEQ ID NO: 23; and a CD3ζ signaling domain comprising the amino acid sequence of SEQ ID NO: 21.

2. The nucleic acid molecule of claim 1, wherein the CAR comprises:
  (a) a CS1 scFv consisting of the amino acid sequence of SEQ ID NO: 1; a spacer domain consisting of the amino acid sequence of SEQ ID NO: 9; a transmembrane domain consisting of the amino acid sequence of SEQ ID NO: 15; a co-signaling domain consisting of the amino acid sequence of SEQ ID NO: 23; and a CD3ζ signaling domain consisting of the amino acid sequence of SEQ ID NO: 21;
  (b) a CS1 scFv consisting of the amino acid SEQ ID NO: 1; a spacer domain consisting of the amino acid sequence of SEQ ID NO: 9; a transmembrane domain consisting of the amino acid sequence of SEQ ID NO: 16; a co-signaling domain consisting of the amino acid sequence of SEQ ID NO: 24; and a CD3ζ signaling domain consisting of the amino acid sequence of SEQ ID NO: 21;
  (c) a CS1 scFv consisting of the amino acid sequence of SEQ ID NO: 1; a spacer domain consisting of the amino acid sequence of SEQ ID NO: 11; a transmembrane domain consisting of the amino acid sequence of SEQ ID NO: 16; a co-signaling domain consisting of the amino acid sequence of SEQ ID NO: 24; and a CD3ζ signaling domain consisting of the amino acid sequence of SEQ ID NO: 21;
  (d) a CS1 scFv consisting of the amino acid sequence of SEQ ID NO: 1; a spacer domain consisting of the amino acid sequence of SEQ ID NO: 11; a transmembrane domain consisting of the amino acid sequence of SEQ ID NO: 15; a co-signaling domain consisting of the amino acid sequence of SEQ ID NO: 23; and a CD3ζ signaling domain consisting of the amino acid sequence of SEQ ID NO: 21;
  (e) a CS1 scFv consisting of the amino acid sequence of SEQ ID NO: 1; a spacer domain consisting of the amino acid sequence of SEQ ID NO: 2; a transmembrane domain consisting of the amino acid sequence of SEQ ID NO: 16; a co-signaling domain consisting of the amino acid sequence of SEQ ID NO: 24; and a CD3ζ signaling domain consisting of the amino acid sequence of SEQ ID NO: 21; or
  (f) a CS1 scFv consisting of the amino acid sequence of SEQ ID NO: 1; a spacer domain consisting of the amino acid sequence of SEQ ID NO: 2; a transmembrane domain consisting of the amino acid sequence of SEQ ID NO: 15; a co-signaling domain consisting of the amino acid sequence of SEQ ID NO: 23; and a CD3ζ signaling domain consisting of the amino acid sequence of SEQ ID NO: 21.

3. A population of human T cells harboring the nucleic acid molecule of claim 1.

4. The population of human T cells of claim 3, wherein at least 20%, 30%, 40%, 50%, 60%, 70% or 80% of the transduced human T cells are central memory T cells.

5. The population of human T cells of claim 4, wherein at least 10% or 20% of the transduced central memory T cells are CD4+.

6. The population of human T cells of claim 4, wherein at least 10% or 20% of the transduced central memory T cells are CD8+.

7. The population of human T cells of claim 4, wherein at least 10% of the central memory T cells are CD4+ and at least 10% are CD8+.

8. The population of human T cells of claim 7, wherein at least 30% of the transduced human T cells are central memory T cells.

9. A population of human T cells harboring the nucleic acid molecule of claim 2.

10. The population of human T cells of claim 9, wherein at least 20%, 30%, 40%, 50%, 60%, 70% or 80% of the transduced human T cells are central memory T cells.

11. The population of human T cells of claim 10, wherein at least 10% or 20% of the transduced central memory T cells are CD4+.

12. The population of human T cells of claim 10, wherein at least 10% or 20% of the transduced central memory T cells are CD8+.

13. The population of human T cells of claim 10, wherein at least 10% of the central memory T cells are CD4+ and at least 10% are CD8+.

14. The population of human T cells of claim 13, wherein at least 30% of the transduced human T cells are central memory T cells.

* * * * *